US012512232B2

(12) United States Patent
Hill et al.

(10) Patent No.: US 12,512,232 B2
(45) Date of Patent: Dec. 30, 2025

(54) LOW LOSS TANGENT DIELECTRIC BASED ON SPINEL-STRUCTURED OXIDE

(71) Applicant: Skyworks Solutions, Inc., Irvine, CA (US)

(72) Inventors: Michael David Hill, Emmitsburg, MD (US); Srinivas Polisetty, Frederick, MD (US)

(73) Assignee: Skyworks Solutions, Inc., Irvine, CA (US)

( * ) Notice: Subject to any disclaimer, the term of this patent is extended or adjusted under 35 U.S.C. 154(b) by 1037 days.

(21) Appl. No.: 17/646,281

(22) Filed: Dec. 28, 2021

(65) Prior Publication Data

US 2022/0208414 A1 Jun. 30, 2022

Related U.S. Application Data

(60) Provisional application No. 63/131,652, filed on Dec. 29, 2020.

(51) Int. Cl.
| | |
|---|---|
| *H01B 3/00* | (2006.01) |
| *C01F 7/02* | (2022.01) |
| *H01B 3/10* | (2006.01) |
| *H01P 1/20* | (2006.01) |
| *H01P 1/36* | (2006.01) |
| *H01P 1/38* | (2006.01) |
| *H01P 7/10* | (2006.01) |
| *H01F 1/34* | (2006.01) |

(52) U.S. Cl.
CPC ............... *H01B 3/002* (2013.01); *C01F 7/02* (2013.01); *H01B 3/10* (2013.01); *H01P 1/2002* (2013.01); *H01P 1/36* (2013.01); *H01P 1/38* (2013.01); *H01P 7/10* (2013.01); *C01P 2002/30* (2013.01); *H01F 1/342* (2013.01); *H01F 1/344* (2013.01)

(58) Field of Classification Search
CPC ..... H01B 3/002; C01P 2002/30; H01F 1/342; H01F 1/344; C04B 35/18
See application file for complete search history.

(56) References Cited

U.S. PATENT DOCUMENTS

| 4,614,725 | A | 9/1986 | Ando |
| 4,721,692 | A | 1/1988 | Nishioka |
| 5,076,815 | A | 12/1991 | Kunz |
| 5,104,834 | A | 4/1992 | Watanabe |
| 5,447,894 | A | 9/1995 | Yasuoka |
| 5,902,763 | A | 5/1999 | Waku |
| 6,362,120 | B1 | 3/2002 | Fukushima |
| 6,723,674 | B2 | 4/2004 | Wang |
| 8,357,262 | B2 | 1/2013 | Nakahara et al. |
| 9,073,789 | B2 * | 7/2015 | Izumi ............ C04B 35/16 |
| 9,428,826 | B2 * | 8/2016 | Ramm ............ C23C 14/325 |
| 10,246,375 | B2 | 4/2019 | Hill |
| 11,081,770 | B2 * | 8/2021 | Hill ............ C04B 37/001 |
| 11,370,711 | B2 | 6/2022 | Hill |
| 11,673,837 | B2 | 6/2023 | Hill |
| 11,699,836 | B2 * | 7/2023 | Hill ............ C01G 31/02 |
| | | | 428/702 |
| 11,715,869 | B2 * | 8/2023 | Hill ............ C04B 35/2675 |
| | | | 428/692.1 |
| 2002/0034667 | A1 | 3/2002 | Sengupta et al. |
| 2002/0151429 | A1 | 10/2002 | Jacquin |
| 2002/0165080 | A1 | 11/2002 | Sengupta et al. |
| 2004/0063566 | A1 | 4/2004 | Caspers et al. |
| 2005/0230884 | A1 | 10/2005 | Schallner et al. |
| 2006/0194690 | A1 | 8/2006 | Osuzu et al. |
| 2007/0128450 | A1 | 6/2007 | Mori et al. |
| 2007/0237935 | A1 | 10/2007 | Mori et al. |
| 2008/0283499 | A1 | 11/2008 | Nakahara et al. |
| 2009/0088314 | A1 | 4/2009 | Abe et al. |
| 2011/0117360 | A1 * | 5/2011 | Izumi ............ C04B 35/195 |
| | | | 264/681 |
| 2014/0021662 | A1 * | 1/2014 | Izumi ............ C04B 35/16 |
| | | | 264/681 |
| 2017/0283327 | A1 | 10/2017 | Hill |

(Continued)

FOREIGN PATENT DOCUMENTS

| CN | 101629314 B | * | 6/2011 | ............ C25D 11/04 |
| JP | H06-048823 A | | 2/1994 | |

(Continued)

OTHER PUBLICATIONS

Saleem et al. "low dielectric constant and signature of ferroelectric nature in transition metal (Co, Ni, Cu)-doped Mg0.5Zn0.5Al2O4 aluminates", Journal of Advanced Dielectrics, vol. 9, No. 4, 2019, 1950034. Published Oct. 9, 2019 (Year: 2019).*
Huang et al. "low-loss microwave dielectrics in the spinel-structured (Mg1—xNix)Al2O4 solid solutions", Journal of American Ceramic Society, 93, 2010, 1999-2003. Published Jul. 2010. (Year: 2010).*
Agarwal et al. "dielectric response and alternating current conductivity in (Co, Ni)Al2O4 nano-spinel", Ceramics International, 43, 2017, 16986-16992. Published online Sep. 15, 2017. (Year: 2017).*
Guo et al. "high-temperature oxidation behavior of Co-based superalloy fabricated through laser powder bed fusion", Corrosion Science, 227, 2024, 111703. Published online Nov. 25, 2023. (Year: 2023).*
Clarivate Analytics machine translation of CN 101629314 B to Cai et al., published Jun. 15, 2011 (Year: 2011).*

*Primary Examiner* — Jane L Stanley
(74) *Attorney, Agent, or Firm* — Knobbe, Martens, Olson & Bear, LLP

(57) ABSTRACT

Disclosed herein are embodiments of high Q, temperature stable materials with low dielectric constants. In one aspect, a low loss dielectric material includes one or more transition metal oxides based on the (Zn, Ni, Co)O—$Al_2O_3$—$TiO_2$ system comprising an aluminate comprising one of cobalt (Co) or nickel (Ni) crystallized in a spinel structure. The low loss dielectric material additionally comprises one or more of: a titanate comprising the one of Co or Ni crystallized in a spinel structure, an aluminum oxide and a titanium oxide crystallized in a rutile structure.

20 Claims, 23 Drawing Sheets

(56) References Cited

U.S. PATENT DOCUMENTS

| | | | |
|---|---|---|---|
| 2018/0044252 A1* | 2/2018 | Soofi | C09D 1/00 |
| 2019/0256423 A1 | 8/2019 | Hill | |
| 2019/0256424 A1 | 8/2019 | Hill | |
| 2021/0032167 A1 | 2/2021 | Hill et al. | |
| 2021/0101834 A1 | 4/2021 | Hill | |
| 2021/0114938 A1 | 4/2021 | Hill | |
| 2023/0202929 A1* | 6/2023 | Hill | C04B 35/465 |
| | | | 501/134 |
| 2024/0030577 A1* | 1/2024 | Hill | C04B 35/2675 |

FOREIGN PATENT DOCUMENTS

| | | |
|---|---|---|
| JP | H09-183648 A | 7/1997 |
| JP | 2006-124217 A | 5/2006 |

* cited by examiner

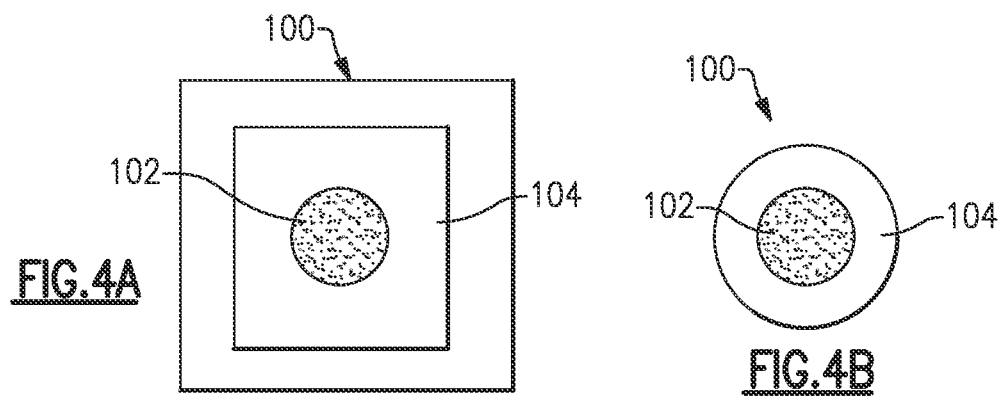
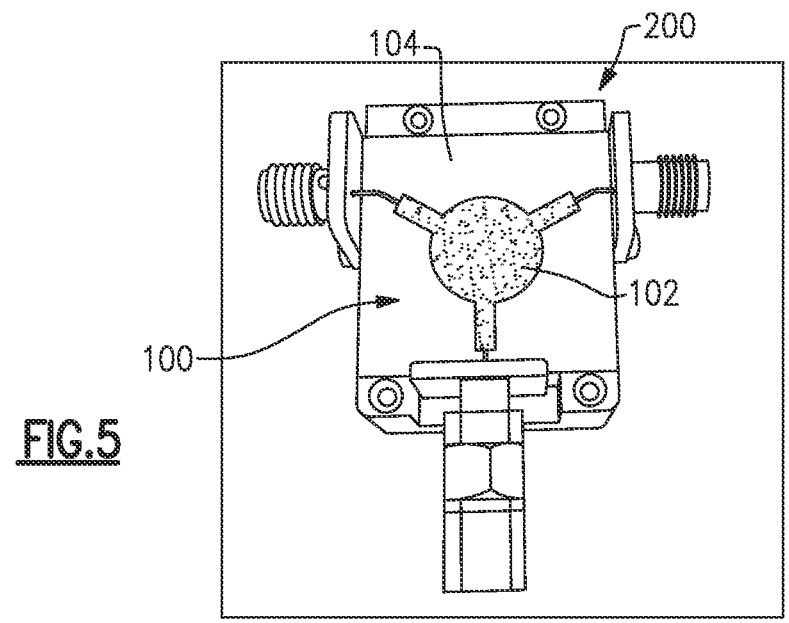
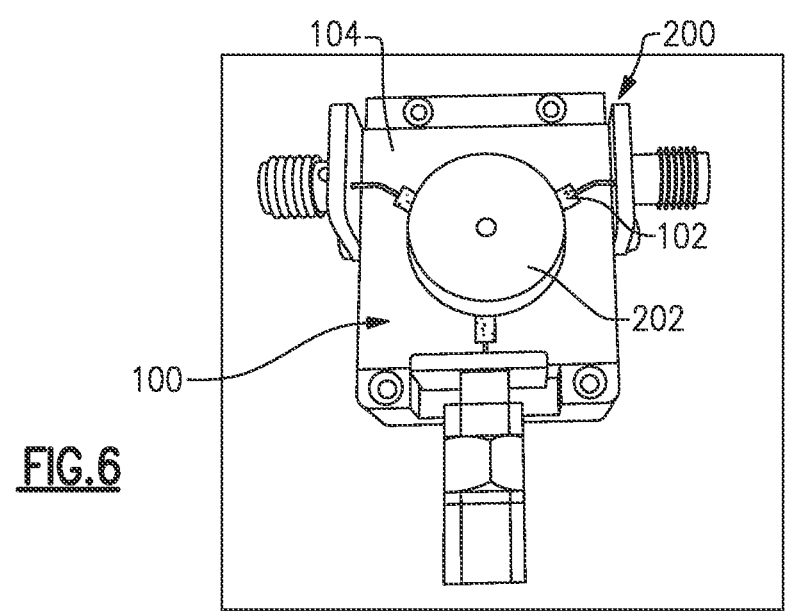

LOW LOSS TANGENT DIELECTRIC BASED ON SPINEL-STRUCTURED OXIDE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

Embodiments of the disclosure generally relate to high Q, temperature stable materials with low dielectric constants.

SUMMARY

In one aspect, a low loss dielectric material comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide crystallized in a corundum structure, and a titanium oxide crystallized in a rutile structure. The low loss dielectric material has a loss tangent less than 0.0001.

In another aspect, a low loss dielectric material comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide crystallized in a corundum structure, and a titanium oxide crystallized in a rutile structure. The low loss dielectric material has a dielectric constant of 8-15.

In another aspect, a low loss dielectric material comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide crystallized in a corundum structure, and a titanium oxide crystallized in a rutile structure. The low loss dielectric material has the low loss dielectric material has a temperature coefficient having a magnitude less than 20 ppm/° C.

In another aspect, radiofrequency component comprises a ceramic disk formed of a low loss dielectric material. The low loss dielectric material comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide crystallized in a corundum structure, and a titanium oxide crystallized in a rutile structure.

In another aspect, method of manufacturing a component for a radio frequency device comprises mixing component oxide powders to form a mixed powder. The method additionally includes calcining the mixed powder and forming the calcined mixed powder into a ceramic disk. The method further includes sintering the ceramic disk, thereby forming the component formed of a low loss dielectric material. The low loss dielectric material according to various embodiments comprises one or more of: a titanate comprising the one of Co or Ni crystallized in a spinel structure, an aluminum oxide crystallized in a corundum structure, and a titanium oxide crystallized in a rutile structure, The component can be any one of a filter, an isolator, a circulator and a resonator.

BRIEF DESCRIPTION OF THE DRAWINGS

FIGS. 4A-4B illustrate an embodiment of a composite tile with a square or circle shape.

FIG. 5 illustrates an integrated microstrip circulator without a magnet.

FIG. 6 illustrates an integrated microstrip circulator with a magnet.

DETAILED DESCRIPTION

Disclosed herein are embodiments of materials, such as ceramic materials, having high Q (low loss tangent), high temperature stability, and low dielectric constants. These materials can be utilized in a number of radiofrequency (RF) devices, in particular for 5G applications, such as filters (e.g., monoblock filters), though these are merely non-limiting examples. Further, embodiments of the material can have relatively low firing temperatures, making them compatible for co-firing with high magnetization nickel zinc ferrite spinels. In particular, a low loss dielectric material includes one or more transition metal oxides based on the (Ni, Co)O—$Al_2O_3$—$TiO_2$ or (Zn, Ni, Co)O—$Al_2O_3$—$TiO_2$ system comprising one or more of a metal aluminate, a metal titanate and a solid solution thereof, where each of the one or more transition metal oxides have the spinel crystal structure. The low loss dielectric material according to various embodiments comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide and a titanium oxide crystallized in a rutile structure. At least some of the aluminate and the titanate when present can form a solid solution.

Embodiments of the disclosure could advantageously allow for 5G systems, in particular operating at 3 GHz and above, to form integrated architectures which can include different components, such as antennas, circulators, amplifiers, and/or semiconductor based amplifiers. By allowing for the integration of these components onto a single substrate, this can improve the overall miniaturization of the device. In some embodiments, the disclosed devices can be operable at frequencies between about 1.8 GHz and about 30 GHz. In some embodiments, the disclosed device can be operable at frequencies of about 1, 2, 3, 4, 5, 10, 15, 20, or 25 GHz. In some embodiments, the disclosed device can be operable at frequencies of greater than about 1, 2, 3, 4, 5, 10, 15, 20, or 25 GHz. In some embodiments, the disclosed device can be operable at frequencies of less than about 30, 25, 20, 15, 10, 5, 4, 3, or 2 GHz.

In some embodiments, the integrated architecture can include a directional coupler and/or isolator in a package size which is not much larger than, or the same size as, a standard isolator. In some embodiments, the integrated architecture can include a high power switch. In addition to using the dielectric tile as a substrate for the impedance transformer, it could also be used as the substrate for the coupler, switch and termination.

Figure 1:
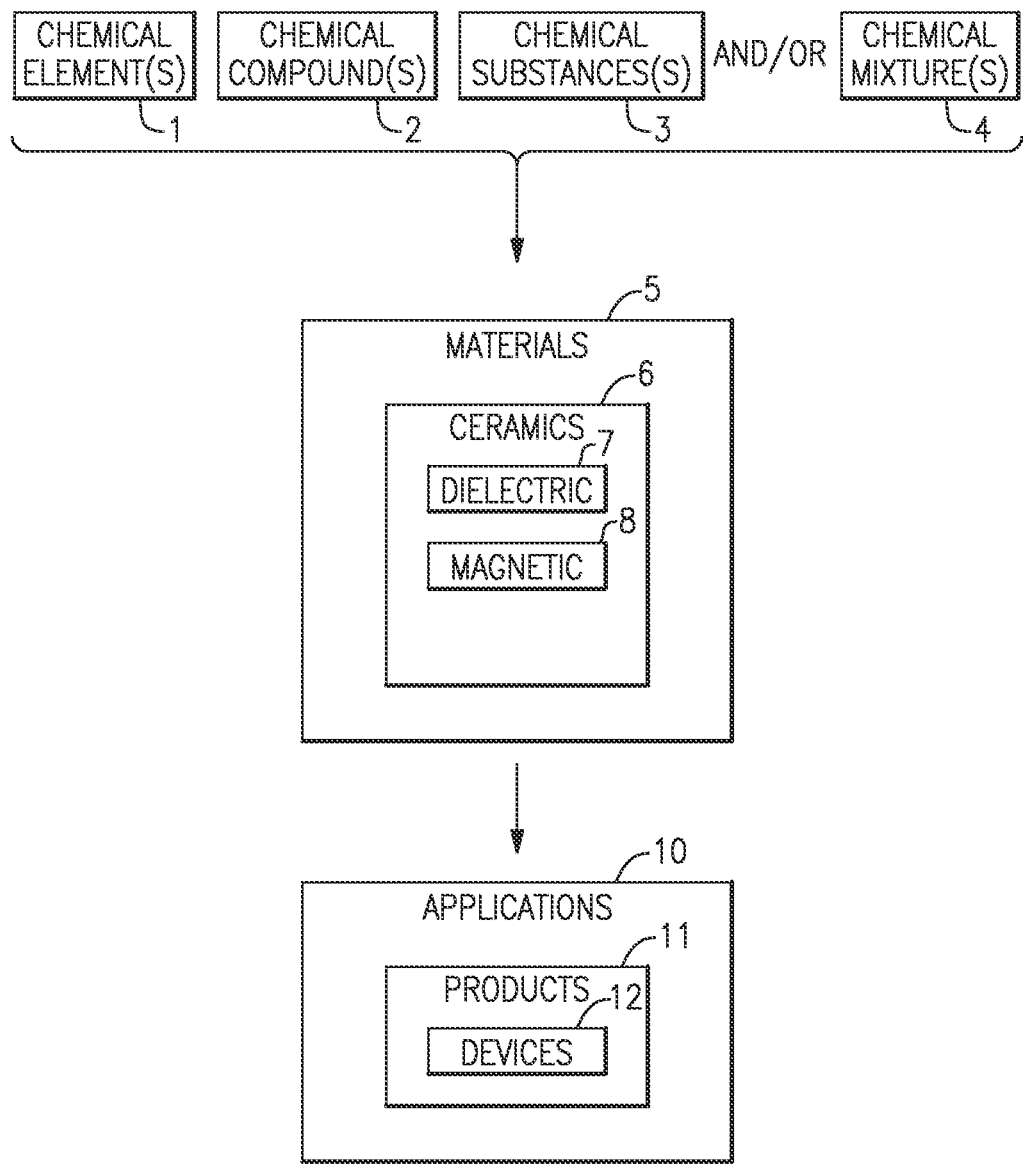
FIG. 1 schematically shows how materials having one or more features described herein can be designed, fabricated, and used.

FIG. 1 schematically shows how one or more chemical elements (block 1), chemical compounds (block 2), chemical substances (block 3) and/or chemical mixtures (block 4) can be processed to yield one or more materials (block 5) having one or more features described herein. In some embodiments, such materials can be formed into ceramic materials (block 6) configured to include a desirable dielectric property (block 7), a magnetic property (block 8).

In some embodiments, a material having one or more of the foregoing properties can be implemented in applications (block 10) such as radio-frequency (RF) application. Such applications can include implementations of one or more features as described herein in devices 12. In some applications, such devices can further be implemented in products 11. Examples of such devices and/or products are described herein.

Microstrip Circulators/Isolators

Circulators are passive multiport devices which can receive and transmit different signals, such as microwave or radiofrequency (RF). These ports can be an external waveguide or transmission line which connects to and from the circulator. Isolators are similar to circulators, but one or more of the ports can be blocked off. Hence, circulator and isolator can be used interchangeably herein as they can be similar in general structural. Thus, all discussion below can apply both to circulators and isolators.

Microstrip circulators and isolators are devices known in the art consist of a thin film circuit deposited over a substrate, such as a dielectric ferrite substrate. In some embodiments, one or more ferrite discs can be adhered onto the substrate. Magnet(s) can then be further attached to circulate a signal through the ferrite disc.

Further, all-ferrite microstrip circulators have been used as well, in particular for radar T/R modules. Circuitry can be printed onto the all ferrite microstrip circulator and a magnet can be added on top to direct the signal. For example, a metallization pattern is formed onto a ferrite substrate. Typically, the metallization pattern consists of a central disc and multiple transmission lines.

Figure 2:
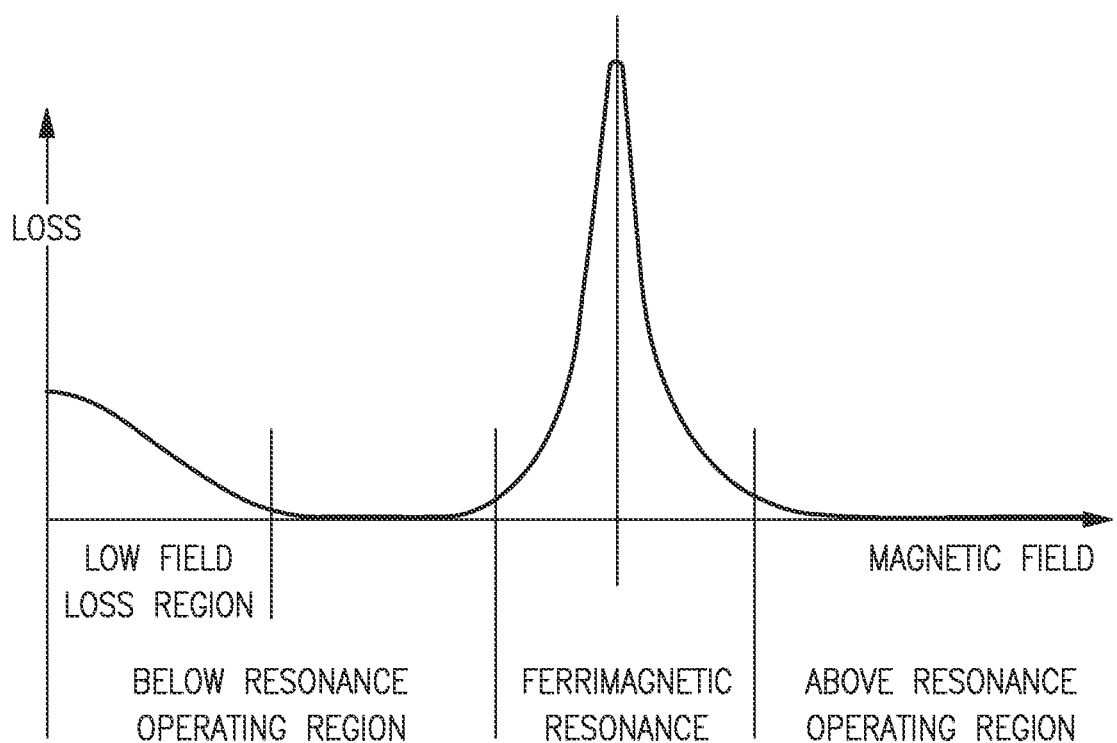
FIG. 2 illustrates a magnetic field v. loss chart.

Circulators generally can operate in either of the above or below resonance operating regions. This is shown in FIG. 2. In some embodiments, above-resonance frequencies can be advantageous for narrow band, sub 4 GHz circulators. For higher frequencies, the below resonance region can be more advantageous.

Microstrip circulators in particular typically work in the below resonance operating region. They use a very small magnet or can be self-biased, such as in the case of hexagonal ferrites. However, square tiles can be a difficult shape to magnetize uniformly, in particular for the all-ferrite microstrip circulators known in the art. Thus, they will operate close to the low field loss region. When transformers are mounted on the lossy unmagnetized ferrite, performance suffers. Further, increased power will make the poor performance even more known. Thus, circulators known in the art suffer from issues due to the ferrite tile being poorly magnetized, leading to poor insertion loss and intermodulation distortion (IMD), and power performance.

Co-Fired Microstrip Circulators/Isolators

Embodiments of the disclosure can improve overall magnetization and reduce performance issues that can occur for currently known microstrip circulators. Generally, the microstrip circulators can be formed by embedding a ferrite disc, such as an oxide ferrite disc made of YIG, directly into a dielectric substrate. The combination can then be co-fired together to form a more solid composite structure. Additionally circuitry, such as formed from silver or other metalized substances, can be added. Without the co-firing process, circuit metallization would not be able to be applied. Embodiments of this disclosure can alleviate some of the significant problems of the art.

Any number of different ferrite disc materials that can be used. In some embodiments, the saturation magnetization levels of the ferrite disc material can range between 1000-5000 (or about 1000-about 5000).

Further, any number of different dielectric substrates known in the art can be used. The dielectric can be formed from dielectric powder or low temperature co-fired ceramic (LTCC) tape. In some embodiments, the dielectric constant can be above 6, 10, 15, 20, 25, 30, 40, 50, or 60 (or about 6, about 10, about 15, about 20, about 25, about 30, about 40, about 50, or about 60). In some embodiments, the dielectric constant can range from 6-30 (or about 6 to about 30). In some embodiments, the dielectric constant can be below 60, 50, 40, 30, 25, 20, 15, or 10 (or about 60, about 50, about 40, about 30, about 25, about 20, about 15, or about 10).

Figure 3A:
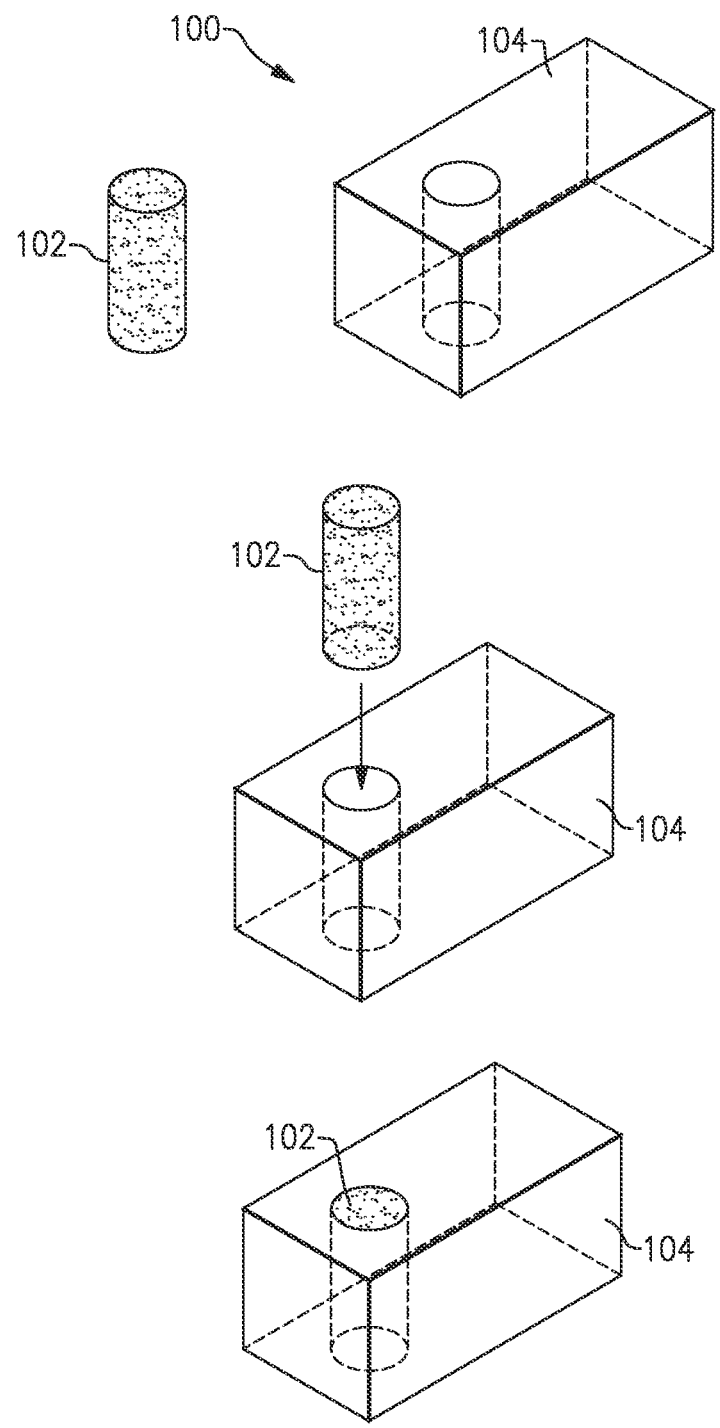
FIGS. 3A-3B illustrate an embodiment of a composite structure having a ferrite cylinder within a rectangular prism or cylindrical substrate.
Figure 3B:
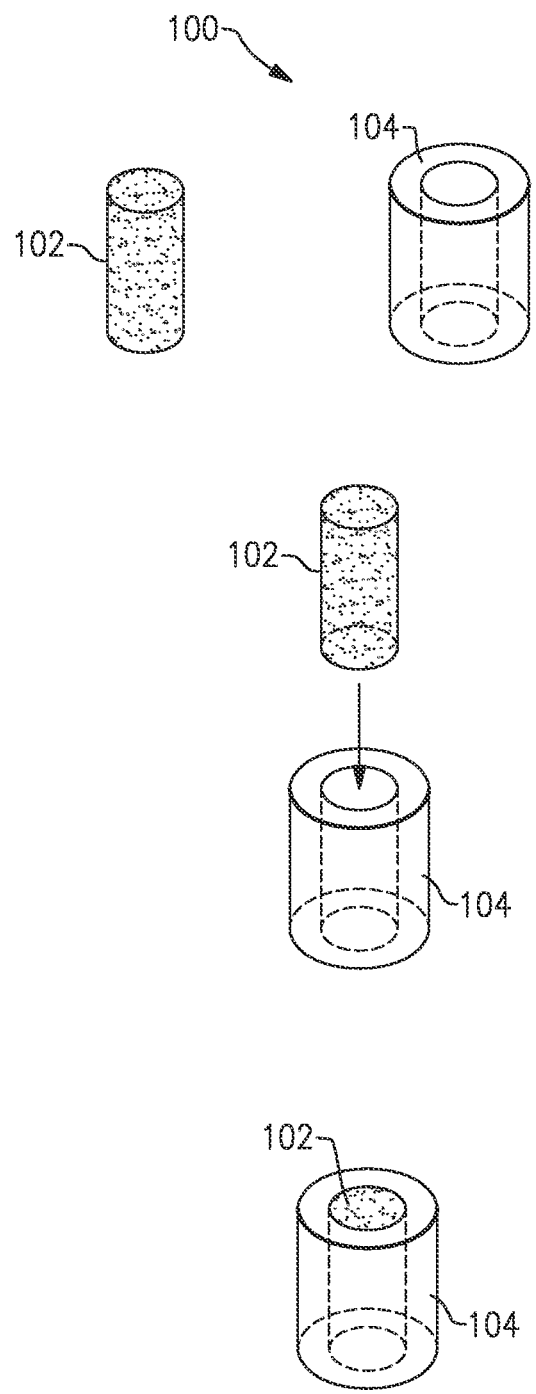

In particular, to form the composite microstrip circulator 100, a magnetic oxide disc 102, or other magnetic disc, can be inserted into an aperture of a dielectric substrate 104 as shown in FIGS. 3A-B. In some embodiments, the disc 102 can be a cylindrical rod, though the particular shape is not limiting. The disc 102 can be green, previously fired, or not-previously fired.

Further, the substrate 104 can generally be a rectangular prism as shown in FIG. 3A, but other shapes can be used as well such as the cylinder shown in FIG. 3B. Embodiments of the substrate 104 are disclosed in more detail below. Once the disc 102 is inside the substrate 104, the components can be co-fired together, using such a method as discussed in U.S. Pat. No. 7,687,014, hereby incorporated by reference in its entirety and discussed below. This co-firing process, further detailed below, can cause the substrate 104 to shrink around the disc 102 and hold it in place in conjunction with adhesives to form the composite structure 100. This composite structure 100 can then be sliced to form the chip structure as shown in FIGS. 4A-B (FIG. 4A showing the rectangular prism slice and FIG. 4B showing the cylinder slice). However, in some embodiments, slicing is not performed and the components are co-fired together at their final thickness. In some embodiments, a plurality of different discs can be inserted into a single substrate in a plurality of different apertures.

Thus, in some embodiments a magnetic oxide disk can be co-fired into a square or rectangular dielectric substrate, or any other shaped substrate, which can then serve as a platform for other components, such as circuitry. This composite structure can then be magnetized to serve as a microstrip circulator and/or isolator package, for example, or the ferrite disc could have been magnetized prior to insertion. In some embodiments, the ferrite disc can be magnetized prior to the co-firing step.

Once the composite structure is formed, other components can be added onto the substrate, such as additional thin film circuits and the like. Thus, embodiments of the disclosure can form an integrated solution which can include a directional coupler and/or isolator in a package size which is not much larger than a standard isolator. Further, advantageously loss may not be affected by the level of magnetic field, or can at least be reduced. In some embodiments, the disclosed circulator will be no larger (and depending on the ferrite/dielectric combination chosen could be smaller) than all current ferrite microstrip circulators.

Thus, using a co-firing process, a ferrite disc can be embedded into a dielectric tile, as shown in FIGS. 4A-B. The thin ferrite disc shown in the figure can be significantly easier to magnetize uniformly than a square, or other oddly shaped piece, known in the art. In some embodiments, the dielectric tile could be about 25 mm square though the particular dimensions are not limiting. This can be used in the 3-4 (or about 3-about 4) GHz region.

Using the dielectric tile, a transformer can then be produced as shown in FIG. 5. As shown, the substrate 104 has space left over for other component attachments. After forming the transformer, only a small magnet needs to be placed on the tile, as shown in FIG. 6. Thus, assembly time can be much shorter than previously done.

In addition to using the dielectric tile as the substrate for the impedance transformer, it could also be used as the substrate for the coupler, switch, and termination. Thus, a number of other components can be added onto the substrate after co-firing, reducing the overall footprint of the device. Further, circuit metallization could be added, but only after the device has been co-fired.

Low Loss Dielectric Materials Including Spinel-Based Transition Metal Oxides

Several competing properties are demanded in material systems for millimeter wave applications. For example, for various components such as dielectric filters, the competing properties include loss tangent, temperature coefficient of resonant frequency and dielectric constant. The loss tangent temperature and coefficient of resonant frequency is desired to be as low as possible. The dielectric constant should be less than about 15, e.g., about 8-15. The inventors have recognized that it is particularly difficult to design materials that can meet combinations of these properties, among others.

To meet the above competing properties, dielectric materials formed from a mixture of multiple metal oxides are often employed. Some material systems for millimeter wave applications include materials having relatively low loss tangent while having relatively poor temperature stability, or materials having relatively high temperature stability while having relatively high loss tangent. For example, combinations of forsterite or magnesium aluminate spinel along with a lossy material, such as calcium titanate, have been proposed. However, these and many other materials do not have both of relatively low loss tangent and relatively high temperature stability. Thus, there is a need for dielectric material systems that can improve upon these shortcomings of existing material systems.

To address this recognized need in the industry, inventors have discovered that, when designing such material systems, it can be advantageous to select multiple metal oxides that have similar loss tangents that can be mixed to tune the dielectric constant. In recognition of these attributes, disclosed herein is a low loss dielectric material which includes one or more transition metal oxides comprising one or more of a first metal aluminate, a metal titanate and a solid solution thereof, where each of the one or more transition metal oxides have spinel crystal structure, and one or both of the metal of the metal aluminate and the metal of the metal titanate comprise cobalt (Co) or nickel (Ni). Advantageously, the disclosed embodiments can meet at least some of the competing material properties for millimeter wave applications.

Advantageously, the disclosed dielectric materials according to embodiments can be engineered to simultaneously exhibit one or more of ultra-low loss tangent, a dielectric constant that can be tuned below 15, and a low temperature coefficient of resonant frequency. These materials can be particularly advantageous when used to fabricate components for millimeter wave application including co-axial resonators over a specific frequency range, for example 1-10 GHz, and dielectric filters, such as monoblock filters and waveguide filters, isolators, and circulators, to name a few examples.

In addition, the dielectric materials according to embodiments can have relatively low firing temperatures (e.g., about 1300° C.), thereby enabling co-firing with other materials of various components, e.g., with high magnetization nickel zinc ferrite spinels for the fabrication of isolators or circulators. According to various embodiments, a composite article fabricated according to the methods described herein can have a magnetic inner, core or surrounded portion (e.g., 102 in FIGS. 3A-3B) and a nonmagnetic outer, shell or surrounding portion (e.g., 104 in FIGS. 3A-3B). The composite article can be one of those described above with respect to FIGS. 3A-3B and 4A-4B, e.g., such as a composite article having a magnetic cylinder, rod or a disc surrounded by a nonmagnetic material. According to various embodiments, a composite article has a magnetic portion comprising a nickel zinc ferrite and a non-magnetic portion contacting the magnetic portion, where the non-magnetic portion comprises a low loss dielectric material according to various embodiments. The loss dielectric material comprises one or more transition metal oxides based on the (Ni, Co)O—$Al_2O_3$—$TiO_2$ system or (Zn, Ni, Co)O—$Al_2O_3$—$TiO_2$ system, which includes one or more of a metal aluminate, a metal titanate and/or a solid solution thereof, where each of the one or more transition metal oxides have the spinel crystal structure. The spinel-structured oxide has a dielectric constant less than about 15, e.g., about 8-15. When the magnetic portion forms the inner portion 102, e.g., a disc, and the non-magnetic portion forms the outer portion 104, e.g., a substrate surrounding the inner portion 102 as illustrated in FIGS. 3A-3B and 4A-4B, the inner portion 102 and the outer portion 104 can be held together without an adhesive therebetween, when processed according to the co-firing process described herein. Thus fabricated components can be used for 5G applications, as well as other applications.

In various embodiments, a low loss dielectric material can be a compound formed based on the (Ni, Co)O—$Al_2O_3$—$TiO_2$ system or (Zn, Ni, Co)O—$Al_2O_3$—$TiO_2$ systems. Advantageously, the (Ni, Co)O—$Al_2O_3$—$TiO_2$ system or (Zn, Ni, Co)O—$Al_2O_3$—$TiO_2$ system can form compounds having a spinel crystal structure that are thermodynamically stable against the rutile phase of titanium oxides ($TiO_2$).

The inventors have recognized various advantages of compounds formed based on the (Ni, Co)O—$Al_2O_3$—$TiO_2$ system or (Zn, Ni, Co)O—$Al_2O_3$—$TiO_2$ system. In particular, it will be appreciated that some phases of the compounds having a spinel crystal structure can have a negative temperature coefficient of resonant frequency and a relatively low dielectric constant (e.g., about 8), while having a low loss tangent. On the other hand, $TiO_2$ having the rutile structure can have a much higher dielectric constant, e.g., as high as 100, a positive temperature coefficient, for example >about +250 ppm/deg. C. and a low loss tangent, for example <about 0.0005. The inventors have recognized that the temperature coefficients of resonant frequency of some materials having the spinel structure and $TiO_2$ having the rutile structure have opposite signs and can offset each other. In addition, both of some materials having the spinel structure and $TiO_2$ can have a low loss tangent. In addition, the dielectric constant can be tuned to have values less than 15. Advantageously, the compounds having a material having the spinel structure and $TiO_2$ having the rutile structure are thermodynamically stable. Thus, once formed, subsequent thermal cycles result in relatively small changes to the tuned material properties.

Additionally, if temperature stability is of less of a concern, a series of low loss tangent dielectric materials with dielectric constants varying from 8 to 100 (or about 8 to about 100) or from 8 to 25 (or about 8 to about 25) can be formed. For example, a mixture of a pure spinel having a low dielectric constant and a pure rutile having a high dielectric constant can be formed with varying ratios of the two tow end members.

In contrast, the inventors have discovered that $MgAl_2O_4$ or $Mg_{1+x}Al_{2-2x}Ti_xO_4$ can be chemically incompatible with rutile, as $MgTiO_3$ and $Mg_2TiO_5$ phases form when $TiO_2$ is added to the magnesium based spinel materials. In recognition of these and other advantages of compounds based on the (Ni, Co)O—$Al_2O_3$—$TiO_2$ or (Zn, Ni, Co)O—$Al_2O_3$—$TiO_2$ system, various embodiments are directed to low loss dielectric materials for millimeter wave applications. The low loss dielectric materials include one or more transition metal oxides based on the (Ni, Co)O—$Al_2O_3$—$TiO_2$ or (Zn, Ni, Co)O—$Al_2O_3$—$TiO_2$ system comprising one or more of a metal aluminate, a metal titanate and/or a solid solution thereof, where each of the one or more transition metal oxides have the spinel crystal structure. The low loss dielectric material according to various embodiments comprises an aluminate comprising one of cobalt (Co) or nickel (Ni) crystallized in a spinel structure. In addition, the low loss dielectric material according to various embodiments comprises one or more of: a titanate comprising the one of Co or Ni crystallized in a spinel structure, an aluminum oxide crystallized in a corundum structure and a titanium oxide crystallized in a rutile structure. At least some of the aluminate and the titanate when present can form a solid solution. In some embodiments, the metal aluminate comprises $NiAl_2O_4$. In these embodiments, when present, the metal titanate comprises $Ni_2TiO_4$. When present, the solid solution of the two comprises $Ni_{1+x}Al_{2-2x}Ti_xO_4$, wherein x is greater than 0 and less than or equal to 0.5, 0.4, 0.3, 0.2, 0.1 or a value in a range defined by any of these values. In these embodiments, the low loss dielectric material can further comprise one or both of $NiTiO_3$ and $Ni_5TiO_7$.

Figure 7A:
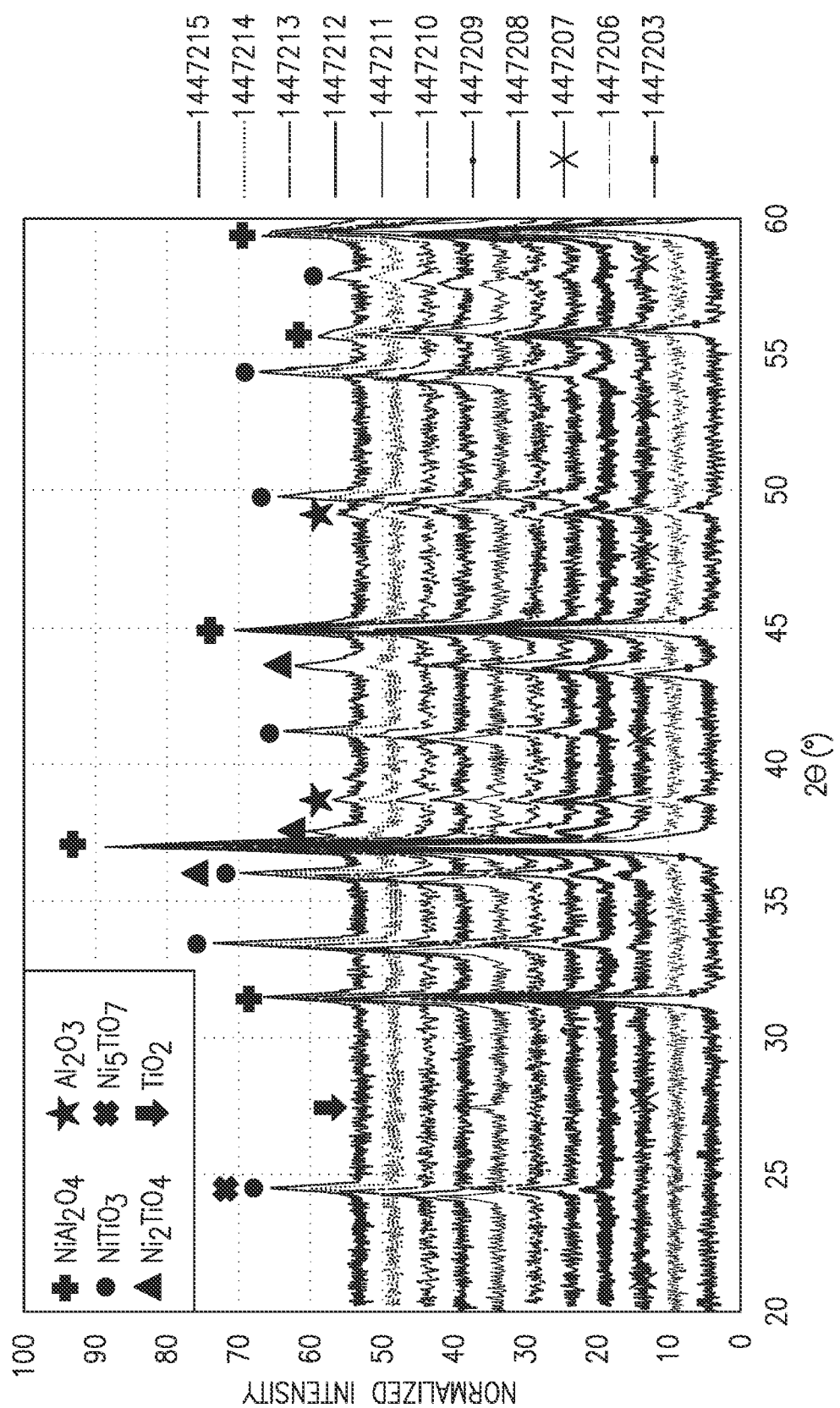
FIG. 7A illustrates x-ray diffraction spectra of low loss dielectric compounds comprising Ni aluminate having a spinel structure, according to embodiments.

FIG. 7A illustrates X-ray diffraction (XRD) spectra of example low loss dielectric compounds comprising Ni aluminate having a spinel structure, according to embodiments. The XRD spectra correspond to the compounds listed in TABLE 1 below.

TABLE 1

| Sample # | $NiAl_2O_4$ (g) | $Ni_2TiO_4$ (g) | $TiO_2$ (g) | $NiAl_2O_4$ (%) | $Ni_2TiO_4$ (%) | $TiO_2$ (%) |
|---|---|---|---|---|---|---|
| 1447215 | 30 | 30 | 4 | 46.88 | 46.88 | 6.67 |
| 1447214 | 36 | 24 | 4 | 56.25 | 37.50 | 6.67 |
| 1447213 | 42 | 18 | 4 | 65.63 | 28.13 | 6.67 |
| 1447212 | 48 | 12 | 4 | 75.00 | 18.75 | 6.67 |
| 1447211 | 54 | 6 | 4 | 84.38 | 9.38 | 6.67 |
| 1447210 | 30 | 30 | 0 | 50 | 50 | 0 |
| 1447209 | 36 | 24 | 0 | 60 | 40 | 0 |
| 1447208 | 42 | 18 | 0 | 70 | 30 | 0 |
| 1447207 | 48 | 12 | 0 | 80 | 20 | 0 |
| 1447206 | 54 | 6 | 0 | 90 | 10 | 0 |
| 1447203 | 57 | 3 | 0 | 95 | 5 | 0 |

In some embodiments, the metal aluminate comprises $CoAl_2O_4$. In these embodiments, when present, the metal titanate comprises $Co_2TiO_4$. When present, the solid solution comprises $Co_{1+x}Al_{2-2x}Ti_xO_4$, wherein x is greater than 0 and less than or equal to 0.5, 0.4, 0.3, 0.2, 0.1 or a value in a range defined by any of these values. In these embodiments, the low loss dielectric material can further comprise $CoTi_2O_5$.

Figure 7B:
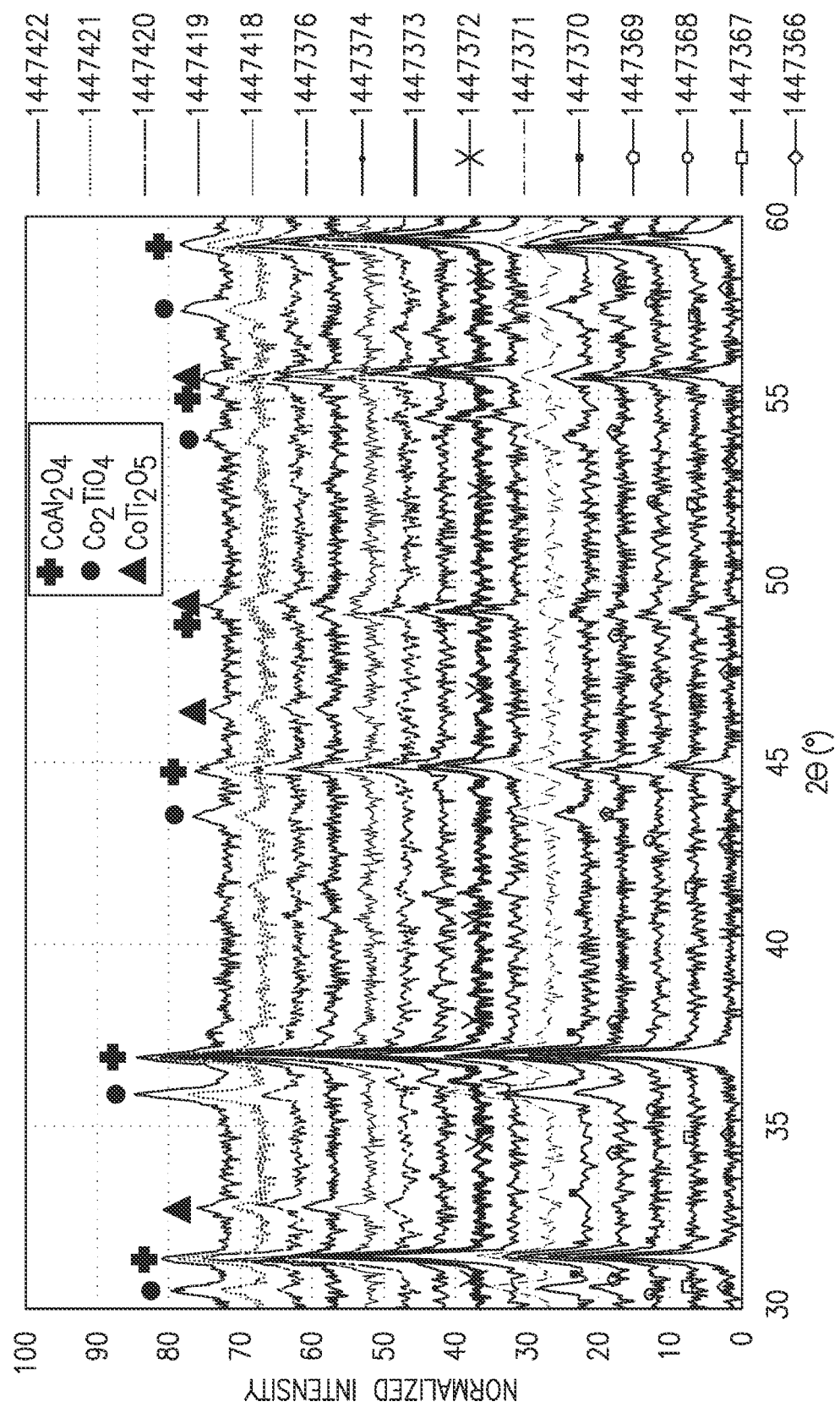
FIG. 7B illustrates x-ray diffraction spectra of low loss dielectric compounds comprising Co aluminate having a spinel structure according to embodiments.

FIG. 7B illustrates X-ray diffraction (XRD) spectra of low loss dielectric compounds comprising Co aluminate having a spinel structure according to embodiments. The XRD spectra correspond to the compounds listed in TABLE 2 below.

TABLE 2

| Sample # | $CoAl_2O_4$ (g) | $Co_2TiO_4$ (g) | $TiO_2$ (g) | $CoAl_2O_4$ (%) | $Co_2TiO_4$ (%) | $TiO_2$ (%) |
|---|---|---|---|---|---|---|
| 1447422 | 30 | 30 | 4 | 46.9 | 46.9 | 6.3 |
| 1447421 | 36 | 24 | 4 | 56.3 | 37.5 | 6.3 |
| 1447420 | 42 | 18 | 4 | 65.6 | 28.1 | 6.3 |
| 1447419 | 48 | 12 | 4 | 75 | 18.8 | 6.3 |
| 1447418 | 54 | 6 | 4 | 84.4 | 9.4 | 6.3 |

TABLE 2-continued

| Sample # | CoAl$_2$O$_4$ (g) | Co$_2$TiO$_4$ (g) | TiO$_2$ (g) | CoAl$_2$O$_4$ (%) | Co$_2$TiO$_4$ (%) | TiO$_2$ (%) |
|---|---|---|---|---|---|---|
| 1447376 | 57 | 3 | 4 | 89.1 | 4.7 | 6.3 |
| 1447374 | 58.8 | 1.2 | 4 | 91.9 | 1.9 | 6.3 |
| 1447373 | 59.4 | 0.6 | 4 | 92.8 | 0.9 | 6.3 |
| 1447372 | 60 | 0 | 4 | 93.8 | 0 | 6.3 |
| 1447371 | 30 | 30 | 0 | 50 | 50 | 0.0 |
| 1447370 | 36 | 24 | 0 | 60 | 40 | 0.0 |
| 1447369 | 42 | 18 | 0 | 70 | 30 | 0.0 |
| 1447368 | 48 | 12 | 0 | 80 | 20 | 0.0 |
| 1447367 | 54 | 6 | 0 | 90 | 10 | 0.0 |
| 1447366 | 57 | 3 | 0 | 95 | 5 | 0.0 |

In some embodiments, the aluminate further comprises zinc. In addition, when present, the titanate can further comprises zinc.

For example, the aluminate comprising Co and Zn can be $(Zn_{1-y}Co_y)Al_2O_4$ and the titanate comprising Co and Zn can be $(Zn_{1-z}Co_z)_2TiO_4$, wherein each of y and z is greater than zero and less than 1. When both are present, at least some of the aluminate and the titanate can form a solid solution comprising $(Zn_{1-y}Co_y)_{1+x}Al_{2-2x}Ti_xO_4$, wherein x is greater than 0 and less than or equal to 0.5, 0.4, 0.3, 0.2, 0.1 or a value in a range defined by any of these values, and wherein each or y and z is greater than zero and less than 1, 0.8, 0.6, 0.4, 0.2, or a value in a range defined by any of these values.

Figure 8A:
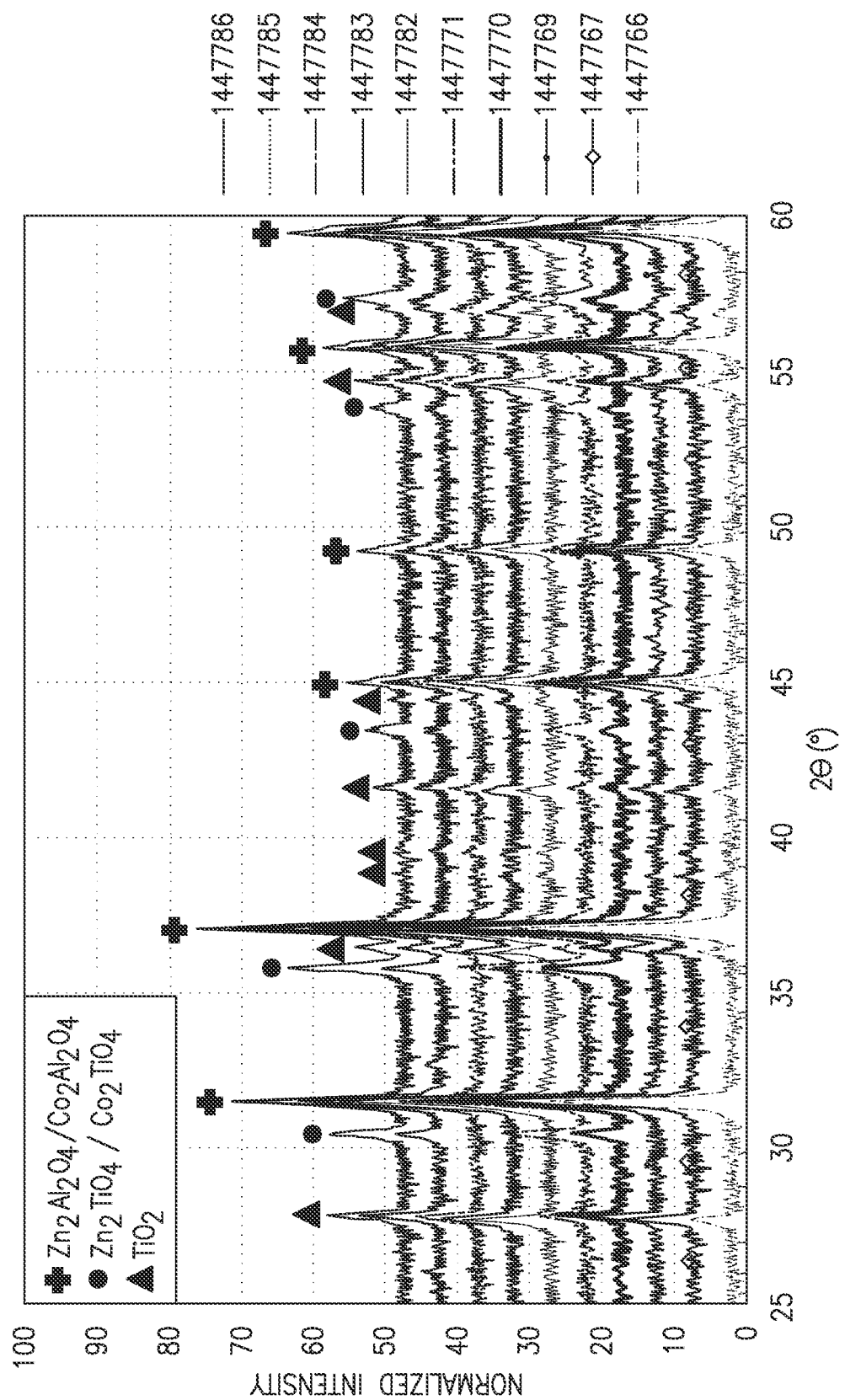
FIG. 8A illustrates x-ray diffraction spectra of low loss dielectric compounds comprising (Zn, Co) aluminate having a spinel structure, according to embodiments.

FIG. 8A illustrates X-ray diffraction spectra of low loss dielectric compounds comprising (Zn, Co) aluminate having a spinel structure, according to embodiments. The XRD spectra correspond to the compounds listed in TABLE 3 below.

TABLE 3

| Sample # | ZnAl$_2$O$_4$ (g) | CoAl$_2$O$_4$ (gr) | Zn$_2$TiO$_4$ (g) | Co$_2$TiO$_4$ (g) | TiO$_2$ (g) | ZnAl$_2$O$_4$ (%) | CoAl$_2$O$_4$ (%) | Zn$_2$TiO$_4$ (%) | Co$_2$TiO$_4$ (%) | TiO$_2$ (%) |
|---|---|---|---|---|---|---|---|---|---|---|
| 1447786 | 29.4 | 12.6 | 12.6 | 5.4 | 6.67 | 44.10 | 18.90 | 18.90 | 8.10 | 10.00 |
| 1447785 | 33.6 | 14.4 | 8.4 | 3.6 | 6.67 | 50.40 | 21.60 | 12.60 | 5.40 | 10.00 |
| 1447784 | 37.8 | 16.2 | 4.2 | 1.8 | 6.67 | 56.70 | 24.30 | 6.30 | 2.70 | 10.00 |
| 1447783 | 39.9 | 17.1 | 2.1 | 0.9 | 6.67 | 59.85 | 25.65 | 3.15 | 1.35 | 10.00 |
| 1447782 | 41.16 | 17.64 | 0.84 | 0.36 | 6.67 | 61.74 | 26.46 | 1.26 | 0.54 | 10.00 |
| 1447771 | 29.4 | 12.6 | 12.6 | 5.4 | 3.16 | 46.55 | 19.95 | 19.95 | 8.55 | 5.00 |
| 1447770 | 33.6 | 14.4 | 8.4 | 3.6 | 3.16 | 53.20 | 22.80 | 13.30 | 5.70 | 5.00 |
| 1447769 | 37.8 | 16.2 | 4.2 | 1.8 | 3.16 | 59.85 | 25.65 | 6.65 | 2.85 | 5.00 |
| 1447767 | 39.9 | 17.1 | 2.1 | 0.9 | 3.16 | 63.17 | 27.07 | 3.32 | 1.42 | 5.00 |
| 1447766 | 41.16 | 17.64 | 0.84 | 0.36 | 3.16 | 65.17 | 27.93 | 1.33 | 0.57 | 5.00 |

For example, the aluminate comprising Ni and Zn can be $(Zn_{1-y}Ni_y)Al_2O_4$ and the titanate comprising Ni and Zn can be $(Zn_{1-z}Ni_z)_2TiO_4$, wherein each of y and z is greater than zero and less than 1. When both are present, at least some of the aluminate and the titanate can form a solid solution comprising $(Zn_{1-y}Ni_y)_{1+x}Al_{2-2x}Ti_xO_4$, wherein x is greater than 0 and less than or equal to 0.5, 0.4, 0.3, 0.2, 0.1 or a value in a range defined by any of these values, and wherein each if y and z is greater than zero and less than 1, 0.8, 0.6, 0.4, 0.2, or a value in a range defined by any of these values.

Figure 8B:
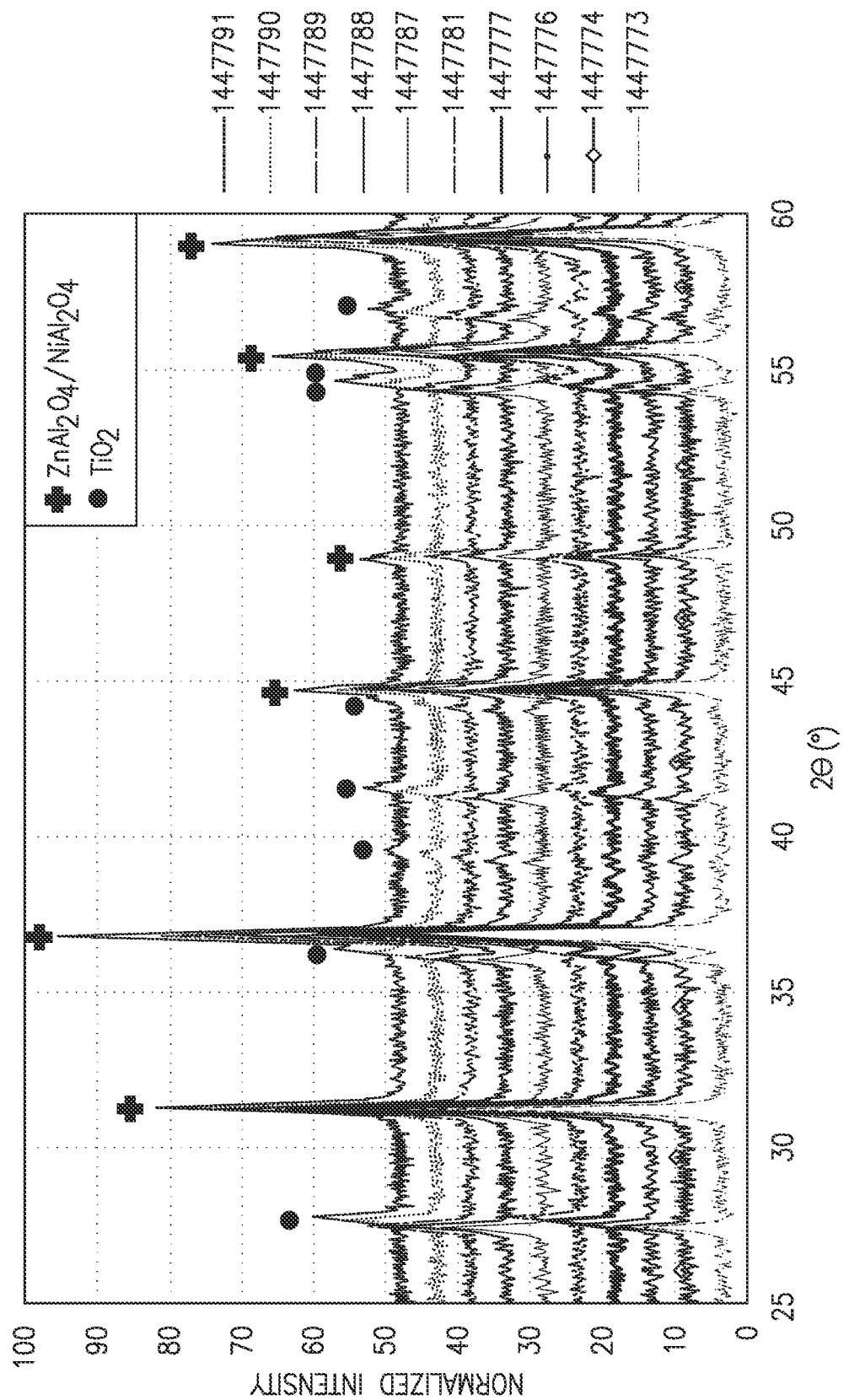
FIG. 8B illustrates x-ray diffraction spectra of low loss dielectric compounds comprising (Zn, Ni) aluminate, according to embodiments.

FIG. 8B illustrates X-ray diffraction spectra of low loss dielectric compounds comprising (Zn, Ni) aluminate, according to embodiments. The XRD spectra correspond to the compounds listed in TABLE 4 below.

TABLE 4

| Sample # | ZnAl$_2$O$_4$ (g) | NiAl$_2$O$_4$ (g) | Zn$_2$TiO$_4$ (g) | Ni$_2$TiO$_4$ (g) | TiO$_2$ (g) | ZnAl$_2$O$_4$ (%) | NiAl$_2$O$_4$ (%) | Zn$_2$TiO$_4$ (%) | Ni$_2$TiO$_4$ (%) | TiO$_2$ (%) |
|---|---|---|---|---|---|---|---|---|---|---|
| 1447791 | 29.4 | 12.6 | 12.6 | 5.4 | 6.67 | 44.10 | 18.90 | 18.90 | 8.10 | 10.00 |
| 1447790 | 33.6 | 14.4 | 8.4 | 3.6 | 6.67 | 50.40 | 21.60 | 12.60 | 5.40 | 10.00 |
| 1447789 | 37.8 | 16.2 | 4.2 | 1.8 | 6.67 | 56.70 | 24.30 | 6.30 | 2.70 | 10.00 |
| 1447788 | 39.9 | 17.1 | 2.1 | 0.9 | 6.67 | 59.85 | 25.65 | 3.15 | 1.35 | 10.00 |
| 1447787 | 41.16 | 17.64 | 0.84 | 0.36 | 6.67 | 61.74 | 26.46 | 1.26 | 0.54 | 10.00 |
| 1447781 | 29.4 | 12.6 | 12.6 | 5.4 | 3.16 | 46.55 | 19.95 | 19.95 | 8.55 | 5.00 |
| 1447777 | 33.6 | 14.4 | 8.4 | 3.6 | 3.16 | 53.20 | 22.80 | 13.30 | 5.70 | 5.00 |
| 1447776 | 37.8 | 16.2 | 4.2 | 1.8 | 3.16 | 59.85 | 25.65 | 6.65 | 2.85 | 5.00 |
| 1447774 | 39.9 | 17.1 | 2.1 | 0.9 | 3.16 | 63.17 | 27.07 | 3.32 | 1.42 | 5.00 |
| 1447773 | 41.16 | 17.64 | 0.84 | 0.36 | 3.16 | 65.17 | 27.93 | 1.33 | 0.57 | 5.00 |

TABLE 5 illustrates experimental measurements of various properties associated with RF applications for selected dielectric compositions according to embodiments.

TABLE 5

Low Loss Dielectric Compositions and Properties

| Powder Composition | Fired Density (g/cm³) | Dielectric Constant | Q | Freq | Qf product | Phases Present |
|---|---|---|---|---|---|---|
| 95% NiAl$_2$O$_4$ – 5% Ni$_2$TiO$_4$ | 4.48 | 10.09 | 1045 | 9.0208 | 9426.736 | Spinel + Al$_2$O$_3$ |
| 90% NiAl$_2$O$_4$ – 10% Ni$_2$TiO$_4$ | 4.45 | 9.15 | 950 | 8.394 | 7974.3 | Spinel + Al$_2$O$_3$ |
| 80% NiAl$_2$O$_4$ – 20% Ni$_2$TiO$_4$ | 4.59 | 9.73 | 757 | 8.1733 | 6187.1881 | Spinel + Al$_2$O$_3$ + NiTiO$_3$ |
| 70% NiAl$_2$O$_4$ – 30% Ni$_2$TiO$_4$ | 4.66 | 10.14 | 734 | 8.1348 | 5970.9432 | Spinel + Al$_2$O$_3$ + NiTiO$_3$ |
| 60% NiAl$_2$O$_4$ – 40% Ni$_2$TiO$_4$ | 4.8 | 10.81 | 660 | 7.8053 | 5151.498 | Spinel + Al$_2$O$_3$ + NiTiO$_3$ |
| 50% NiAl$_2$O$_4$ – 50% Ni$_2$TiO$_4$ | 4.84 | 11.57 | 645 | 7.8765 | 5080.3425 | Spinel + Al$_2$O$_3$ + NiTiO$_3$ |
| 100% NiAl$_2$O$_4$ + 4% additional TiO$_2$ | 4.25 | 9.6 | 3136 | 8.4187 | 26401.0432 | |
| 99% NiAl$_2$O$_4$ – 1% Ni$_2$TiO$_4$ + 4% additional TiO$_2$ | 4.25 | 9.62 | 2579 | 8.3707 | 21588.0353 | |
| 98% NiAl$_2$O$_4$ – 2% Ni$_2$TiO$_4$ + 4% additional TiO$_2$ | 4.26 | 9.65 | 2653 | 8.2582 | 21909.0046 | |
| 95% NiAl$_2$O$_4$ – 5% Ni$_2$TiO$_4$ + 4% additional TiO$_2$ | 4.3 | 9.7 | 2830 | 8.1808 | 23151.664 | |
| 90% NiAl$_2$O$_4$ – 10% Ni$_2$TiO$_4$ + 4% additional TiO$_2$ | 4.36 | 9.88 | 2768 | 8.1228 | 22483.9104 | Spinel + Al$_2$O$_3$ + TiO$_2$ (Rutile) |
| 80% NiAl$_2$O$_4$ – 20% Ni$_2$TiO$_4$ + 4% additional TiO$_2$ | 4.58 | 10.55 | 1582 | 7.8781 | 12463.1542 | Spinel + Al$_2$O$_3$ + NiTiO$_3$ |
| 70% NiAl$_2$O$_4$ – 30% Ni$_2$TiO$_4$ + 4% additional TiO$_2$ | 4.67 | 11.11 | 974 | 7.967 | 7759.858 | Spinel + Al$_2$O$_3$ + NiTiO$_3$ |
| 60% NiAl$_2$O$_4$ – 40% Ni$_2$TiO$_4$ + 4% additional TiO$_2$ | 4.76 | 11.55 | 773 | 7.5455 | 5832.6715 | Spinel + Al$_2$O$_3$ + NiTiO$_3$ |
| 50% NiAl$_2$O$_4$ – 50% Ni$_2$TiO$_4$ + 4% additional TiO$_2$ | 4.86 | 12.35 | 599 | 7.3875 | 4425.1125 | Spinel + Al$_2$O$_3$ + NiTiO$_3$ |
| 95% CoAl$_2$O$_4$ – 5% Co$_2$TiO$_4$ | 4.14 | 9.06 | 3816 | 8.4295 | 32166.972 | Spinel |
| 90% CoAl$_2$O$_4$ – 10% Co$_2$TiO$_4$ | 4.19 | 9.43 | 3209 | 8.2701 | 26538.7509 | Spinel |
| 80% CoAl$_2$O$_4$ – 20% Co$_2$TiO$_4$ | 4.35 | 10.3 | 4219 | 7.956 | 33566.364 | Spinel |
| 70% CoAl$_2$O$_4$ – 30% Co$_2$TiO$_4$ | 4.54 | 11.43 | 4548 | 7.7038 | 35036.8824 | Two spinels |
| 60% CoAl$_2$O$_4$ – 40% Co$_2$TiO$_4$ | 4.62 | 12.26 | 5503 | 7.3448 | 40418.4344 | Two spinels |
| 50% CoAl$_2$O$_4$ – 50% Co$_2$TiO$_4$ | 4.68 | 13.06 | 5657 | 7.1403 | 40392.6771 | Two spinels |
| 100% CoAl$_2$O$_4$ + 4% additional TiO$_2$ | 4.35 | 11.46 | 3944 | 7.5868 | 29922.3392 | Spinel + TiO$_2$ (Rutile) |
| 99% CoAl$_2$O$_4$ – 1% Co$_2$TiO$_4$ + 4% additional TiO$_2$ | 4.35 | 11.37 | 2859 | 7.6292 | 21811.8828 | Spinel + TiO$_2$ (Rutile) |
| 98% CoAl$_2$O$_4$ – 2% Co$_2$TiO$_4$ + 4% additional TiO$_2$ | 4.34 | 11.34 | 3000 | 7.8239 | 23471.7 | Spinel + TiO$_2$ (Rutile) |
| 95% CoAl$_2$O$_4$ – 5% Co$_2$TiO$_4$ + 4% additional TiO$_2$ | 4.33 | 11.15 | 3888 | 8.0568 | 31324.8384 | Spinel + CoTi$_2$O$_5$ |
| 90% CoAl$_2$O$_4$ – 10% Co$_2$TiO$_4$ + 4% additional TiO$_2$ | 4.36 | 10.87 | 4056 | 8.0179 | 32520.6024 | Spinel + CoTi$_2$O$_5$ |
| 80% CoAl$_2$O$_4$ – 20% Co$_2$TiO$_4$ + 4% additional TiO$_2$ | 4.41 | 11.48 | 5605 | 7.6474 | 42863.677 | Spinel + CoTi$_2$O$_5$ |
| 70% CoAl$_2$O$_4$ – 30% Co$_2$TiO$_4$ + 4% additional TiO$_2$ | 4.5 | 12.27 | 4389 | 7.5538 | 33153.6282 | Two spinels + CoTi$_2$O$_5$ |

TABLE 5-continued

Low Loss Dielectric Compositions and Properties

| Powder Composition | Fired Density (g/cm³) | Dielectric Constant | Q | Freq | Qf product | Phases Present |
|---|---|---|---|---|---|---|
| 60% CoAl$_2$O$_4$ – 40% Co$_2$TiO$_4$ + 4% additional TiO$_2$ | 4.52 | 12.97 | 5626 | 7.4222 | 41757.2972 | Two spinels + CoTi$_2$O$_5$ |
| 50% CoAl$_2$O$_4$ – 50% Co$_2$TiO$_4$ + 4% additional TiO$_2$ | 4.61 | 13.83 | 2723 | 7.1932 | 19587.0836 | Two spinels + CoTi$_2$O$_5$ |
| 98% (Zn$_7$Co$_3$)Al$_2$O$_4$ – 2% (Zn$_7$Co$_3$)$_2$TiO$_4$ + 3.16% additional TiO$_2$ | 4.26 | 9.96 | 3515 | 8.3112 | 29213.868 | Spinel + TiO$_2$ (Rutile) |
| 95% (Zn$_7$Co$_3$)Al$_2$O$_4$ – 5% (Zn$_7$Co$_3$)2TiO$_4$ + 3.16% additional TiO$_2$ | 4.4 | 10.52 | 5696 | 8.0417 | 45805.5232 | Spinel + TiO$_2$ (Rutile) |
| 90% (Zn$_7$Co$_3$)Al$_2$O$_4$ – 10% (Zn$_7$Co$_3$)$_2$TiO$_4$ + 3.16% additional TiO$_2$ | 4.51 | 11.18 | 5732 | 8.025 | 45999.3 | Spinel + TiO$_2$ (Rutile) |
| 80% (Zn$_7$Co$_3$)Al$_2$O$_4$ – 20% (Zn$_7$Co$_3$)$_2$TiO$_4$ + 3.16% additional TiO$_2$ | 4.6 | 12.03 | 5202 | 7.6196 | 39637.1592 | Two spinels + TiO$_2$ (Rutile) |
| 70% (Zn$_7$Co$_3$)Al$_2$O$_4$ – 30% (Zn$_7$Co$_3$)$_2$TiO$_4$ + 3.16% additional TiO$_2$ | 4.67 | 12.76 | 6323 | 7.2156 | 45624.2388 | Two spinels + TiO$_2$ (Rutile) |
| 98% (Zn$_7$Ni$_3$)Al$_2$O$_4$ – 2% (Zn$_7$Ni$_3$)$_2$TiO$_4$ + 3.16% additional TiO$_2$ | 4.16 | 8.94 | 861 | 8.64 | 7439.04 | Spinel + TiO$_2$ (Rutile) |
| 95% (Zn$_7$Ni$_3$)Al$_2$O$_4$ – 5% (Zn$_7$Ni$_3$)$_2$TiO$_4$ + 3.16% additional TiO$_2$ | 4.18 | 9.49 | 1115 | 8.4108 | 9378.042 | Spinel + TiO$_2$ (Rutile) |
| 90% (Zn$_7$Ni$_3$)Al$_2$O$_4$ – 10% (Zn$_7$Ni$_3$)$_2$TiO$_4$ + 3.16% additional TiO$_2$ | 4.33 | 10.27 | 2347 | 8.0828 | 18970.3316 | Spinel + TiO$_2$ (Rutile) |
| 80% (Zn$_7$Ni$_3$)Al$_2$O$_4$ – 20% (Zn$_7$Ni$_3$)$_2$TiO$_4$ + 3.16% additional TiO$_2$ | 4.47 | 11.23 | 2408 | 8.2343 | 19828.1944 | Spinel + TiO$_2$ (Rutile) |
| 70% (Zn$_7$Ni$_3$)Al$_2$O$_4$ – 30% (Zn$_7$Ni$_3$)$_2$TiO$_4$ + 3.16% additional TiO$_2$ | 4.61 | 12.15 | 2347 | 7.4137 | 17399.9539 | Spinel + TiO$_2$ (Rutile) |
| 98% (Zn$_7$Co$_3$)Al$_2$O$_4$ – 2% (Zn$_7$Co$_3$)$_2$TiO$_4$ + 6.67% additional TiO$_2$ | 4.32 | 12.08 | 4132 | 7.7989 | 32225.0548 | Spinel + TiO$_2$ (Rutile) |
| 95% (Zn$_7$Co$_3$)Al$_2$O$_4$ – 5% (Zn$_7$Co$_3$)$_2$TiO$_4$ + 6.67% additional TiO$_2$ | 4.47 | 13.2 | 5394 | 7.4369 | 40114.6386 | Spinel + TiO$_2$ (Rutile) |
| 90% (Zn$_7$Co$_3$)Al$_2$O$_4$ – 10% (Zn$_7$Co$_3$)$_2$TiO$_4$ + 6.67% additional TiO$_2$ | 4.53 | 13.81 | 2862 | 7.0344 | 20132.4528 | Spinel + TiO$_2$ (Rutile) |
| 80% (Zn$_7$Co$_3$)Al$_2$O$_4$ – 20% (Zn$_7$Co$_3$)2TiO$_4$ + 6.67% additional TiO$_2$ | 4.58 | 13.92 | 7555 | 7.0906 | 53569.483 | Two spinels + TiO$_2$ (Rutile) |
| 70% (Zn$_7$Co$_3$)Al$_2$O$_4$ – 30% (Zn$_7$Co$_3$)$_2$TiO$_4$ + 6.67% additional TiO$_2$ | 4.65 | 14.66 | 7372 | 7.314 | 53918.808 | Two spinels + TiO$_2$ (Rutile) |
| 98% (Zn7Ni3)Al$_2$O$_4$ – | 4.14 | 10.69 | 1637 | 7.9441 | 13004.4917 | Spinel + TiO$_2$ (Rutile) |

TABLE 5-continued

Low Loss Dielectric Compositions and Properties

| Powder Composition | Fired Density (g/cm$^3$) | Dielectric Constant | Q | Freq | Qf product | Phases Present |
|---|---|---|---|---|---|---|
| 2% (Zn$_7$Ni$_3$)$_2$TiO$_4$ + 6.67% additional TiO$_2$ | | | | | | |
| 95% (Zn$_7$Ni$_3$)Al$_2$O$_4$ – 5% (Zn$_7$Ni$_3$)$_2$TiO$_4$ + 6.67% additional TiO$_2$ | 4.26 | 11.44 | 2747 | 7.5867 | 20840.6649 | Spinel + TiO$_2$ (Rutile) |
| 90% (Zn$_7$Ni$_3$)Al$_2$O$_4$ – 10% (Zn$_7$Ni$_3$)$_2$TiO$_4$ + 6.67% additional TiO$_2$ | 4.39 | 12.32 | 2549 | 7.5605 | 19271.7145 | Spinel + TiO$_2$ (Rutile) |
| 80% (Zn$_7$Ni$_3$)Al$_2$O$_4$ – 20% (Zn$_7$Ni$_3$)$_2$TiO$_4$ + 6.67% additional TiO$_2$ | 4.53 | 13.97 | 2703 | 7.4885 | 20241.4155 | Spinel + TiO$_2$ (Rutile) |
| 70% (Zn$_7$Ni$_3$)Al$_2$O$_4$ – 30% (Zn$_7$Ni$_3$)$_2$TiO$_4$ + 6.67% additional TiO$_2$ | 4.64 | 14.14 | 2522 | 6.9127 | 17433.8294 | Spinel + TiO$_2$ (Rutile) |

In some embodiments, two thermodynamically stable phases are formed in the material. For example, a spinel and a rutile can be formed, which are thermodynamically stable together. In some embodiments, the spinel includes a metal aluminate comprising one or more of Ni, Co and Zn. In some embodiments, the spinel includes a metal titanate comprising one or more of Ni, Co and Zn. In some embodiments, three phases can be formed. For example, two spinels and a rutile phase can be formed.

In some embodiments, the material can have a dielectric constant of 7.6 to 14.85 (or about 7.6 to about 14.85). In some embodiments, the material can have a dielectric constant of 8.4 to 10.9 (or about 8.4 to about 10.9). In some embodiments, the material can have a dielectric constant in the range of 12-13 (or about 12-about 13). In some embodiments, the material can have a dielectric constant of 15, 14, 13, 12, 11, 10 or below (or about 15, about 14, about 13, about 12, about 11, about 10 or below). In some embodiments, the material can have a dielectric constant of 7, 8, 9, 10, 11, 12, 13 (or about 7, about 8, about 9, about 10, about 11, about 12, about 13 or above).

In some embodiments, the material can include 0.3-0.4 (or about 0.3-about 0.4) mole fraction of one or more of ZnO, CoO and NiO.

In some embodiments, the material can include 0.5 to 0.65 (or about 0.5 to about 0.65) mole fraction AlO$_{1.5}$.

In some embodiments, the material can include 0.01 to 0.5 (or about 0.01 to about 0.5) mole fraction TiO$_2$.

In some embodiments, the material may have a temperature coefficient of resonant frequency, in ppm/deg. C., from of 0 or about 0. In some embodiments, the material may have a temperature coefficient of resonant frequency, in ppm/deg. C., of within +/−5 (or about 5). In some embodiments, the material may have a temperature coefficient of resonant frequency, in ppm/deg. C., of +/−10 (or about 10). In some embodiments, the material may have a temperature coefficient of resonant frequency, in ppm/deg. C., of within +/−15 (or about 15). In some embodiments, the material may have a temperature coefficient of resonant frequency, in ppm/deg. C., of within +/−20 (or about 20). In some embodiments, the material may have a temperature coefficient of resonant frequency, in ppm/deg. C., of within +/−25 (or about 25). In some embodiments, the material may have a temperature coefficient of resonant frequency, in ppm/deg. C., of within +/−50 (or about 50). In some embodiments, the material may have a temperature coefficient of resonant frequency, in ppm/deg. C., of within +/−100 (or about 100).

In some embodiments, the material may have a Q of 500-10,000 or a value in a range defined by any of the values in TABLE 5.

In some embodiments, the material can have a Qf product greater than 4000 or a value in a range defined by any of the values in TABLE 5.

In some embodiments, by varying the volume fraction of spinel and rutile phases, a low loss tangent non-temperature stable dielectric with dielectric constants varying form 8-100 can be formed. In some embodiments, the loss tangent can be <0.0001 (or <about 0.0001).

In some embodiments, the material can have a firing temperature of 1300° C. In some embodiments, the material can have a firing temperature of 1250-1400 (or about 1250-1400) ° C.

The low loss dielectric materials may be manufactured by mixing component oxide powders comprising the elements of the low loss dielectric material according to various embodiments disclosed herein. Specifically, powder components such as those disclosed in TABLES 1-5 can be calcined together. The calcined material can then be formed and sintered to produce a final radiofrequency component as disclosed herein. The calcining can occur at about 1000-1200° C. In some embodiments, the phases disclosed herein can form during the calcining. In some embodiments, the phases can start to form during the calcining, but can finalize formation during sintering. Sintering can be performed post calcining, at temperatures of 1250-1400° C.

5G Applications

Embodiments of the disclosed composite microstrip circulators can be particularly advantageous for 5th generation wireless system (5G) applications, though could also be used for early 4G and 3G applications as well. 5G technology is also referred to herein as 5G New Radio (NR). 5G networks can provide for significantly higher capacities than current 4G system, which allows for a larger number of consumers in an area. This can further improve uploading/downloading limits and requirements. In particular, the large number of circulators, such as those described herein, needed for 5G (typically 1 per front end module or FEM) requires further integration of components. The disclosed embodiments of circulators can allow for this integration and thus can be particularly advantageous. Other components in the front end module will be microstrip or SMT based.

Preliminary specifications for 5G NR support a variety of features, such as communications over millimeter wave spectrum, beam forming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

Figure 9:
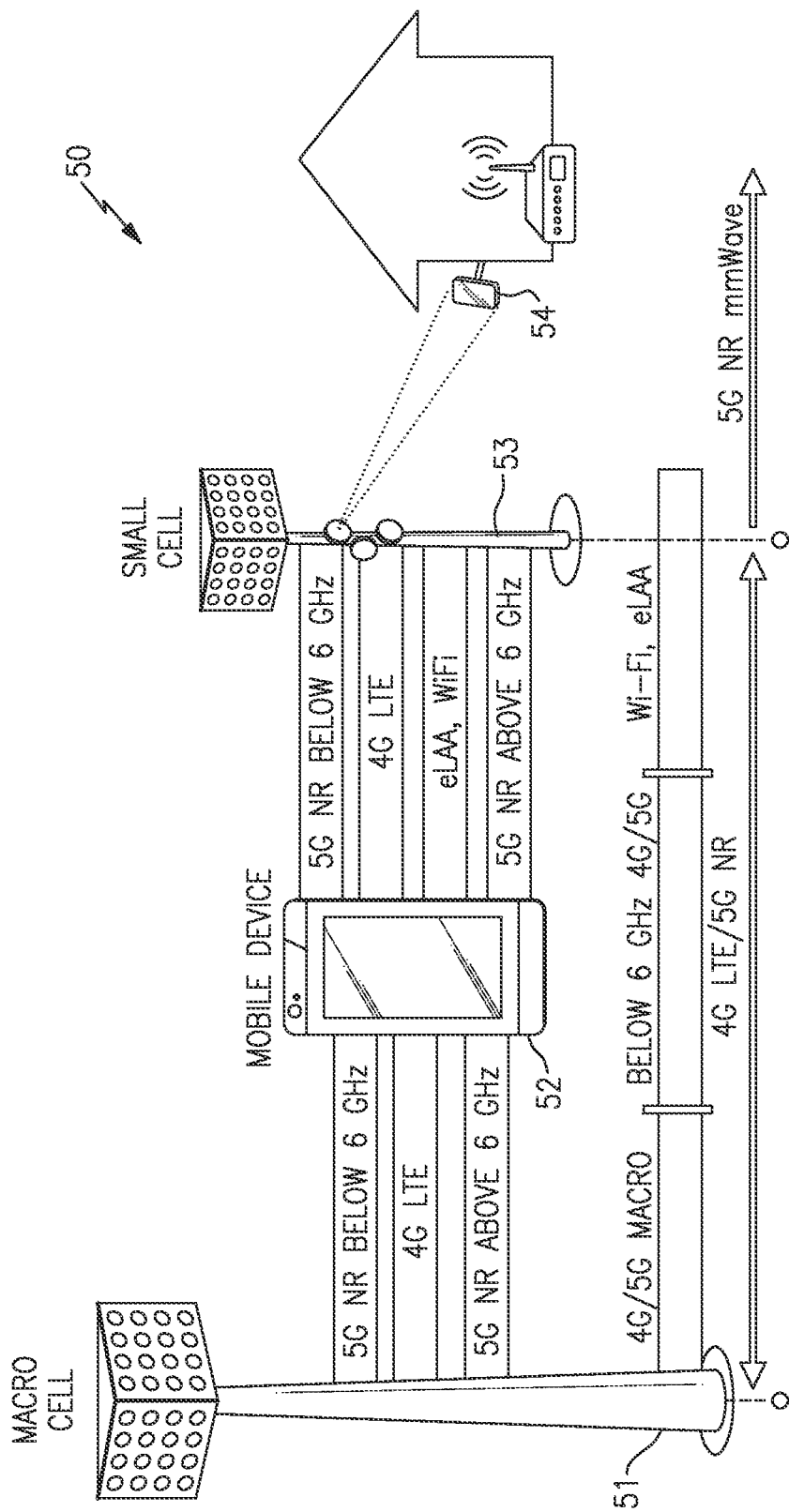
FIG. 9 is a schematic diagram of one example of a communication network.

FIG. 9 is a schematic diagram of one example of a communication network 50. The communication network 50 includes a macro cell base station 51, a mobile device 52, a small cell base station 53, and a stationary wireless device 54.

The illustrated communication network 50 of FIG. 9 supports communications using a variety of technologies, including, for example, 4G LTE, 5G NR, and wireless local area network (WLAN), such as Wi-Fi. Although various examples of supported communication technologies are shown, the communication network 50 can be adapted to support a wide variety of communication technologies.

Various communication links of the communication network 50 have been depicted in FIG. 9. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

As shown in FIG. 9, the mobile device 52 communicates with the macro cell base station 51 over a communication link that uses a combination of 4G LTE and 5G NR technologies. The mobile device 52 also communicates with the small cell base station 53 which can include embodiments of the disclosure. In the illustrated example, the mobile device 52 and small cell base station 53 communicate over a communication link that uses 5G NR, 4G LTE, and Wi-Fi technologies.

In certain implementations, the mobile device 52 communicates with the macro cell base station 52 and the small cell base station 53 using 5G NR technology over one or more frequency bands that are less than 6 Gigahertz (GHz). In one embodiment, the mobile device 52 supports a HPUE power class specification.

The illustrated small cell base station 53, incorporating embodiments of the disclosure, also communicates with a stationary wireless device 54. The small cell base station 53 can be used, for example, to provide broadband service using 5G NR technology over one or more frequency bands above 6 GHz, including, for example, millimeter wave bands in the frequency range of 30 GHz to 300 GHz.

In certain implementations, the small cell base station 53 communicates with the stationary wireless device 54 using beamforming. For example, beamforming can be used to focus signal strength to overcome path losses, such as high loss associated with communicating over millimeter wave frequencies.

The communication network 50 of FIG. 9 includes the macro cell base station 51, which can include embodiments of the disclosure, and the small cell base station 53. In certain implementations, the small cell base station 53 can operate with relatively lower power, shorter range, and/or with fewer concurrent users relative to the macro cell base station 51. The small cell base station 53 can also be referred to as a femtocell, a picocell, or a microcell.

Although the communication network 50 is illustrated as including two base stations, the communication network 50 can be implemented to include more or fewer base stations and/or base stations of other types.

The communication network 50 of FIG. 9 is illustrated as including one mobile device and one stationary wireless device. The mobile device 52 and the stationary wireless device 54 illustrate two examples of user devices or user equipment (UE). Although the communication network 50 is illustrated as including two user devices, the communication network 50 can be used to communicate with more or fewer user devices and/or user devices of other types. For example, user devices can include mobile phones, tablets, laptops, IoT devices, wearable electronics, and/or a wide variety of other communications devices.

User devices of the communication network 50 can share available network resources (for instance, available frequency spectrum) in a wide variety of ways.

Enhanced mobile broadband (eMBB) refers to technology for growing system capacity of LTE networks. For example, eMBB can refer to communications with a peak data rate of at least 10 Gbps and a minimum of 100 Mbps for each user device. Ultra-reliable low latency communications (uRLLC) refers to technology for communication with very low latency, for instance, less than 2 ms. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 50 of FIG. 9 can be used to support a wide variety of advanced communication features, including, but not limited to eMBB, uRLLC, and/or mMTC.

A peak data rate of a communication link (for instance, between a base station and a user device) depends on a variety of factors. For example, peak data rate can be affected by channel bandwidth, modulation order, a number of component carriers, and/or a number of antennas used for communications.

For instance, in certain implementations, a data rate of a communication link can be about equal to $M*B*\log_2(1+S/N)$, where M is the number of communication channels, B is the channel bandwidth, and S/N is the signal-to-noise ratio (SNR).

Accordingly, data rate of a communication link can be increased by increasing the number of communication channels (for instance, transmitting and receiving using multiple antennas), using wider bandwidth (for instance, by aggregating carriers), and/or improving SNR (for instance, by increasing transmit power and/or improving receiver sensitivity).

5G NR communication systems can employ a wide variety of techniques for enhancing data rate and/or communication performance.

Figure 10:
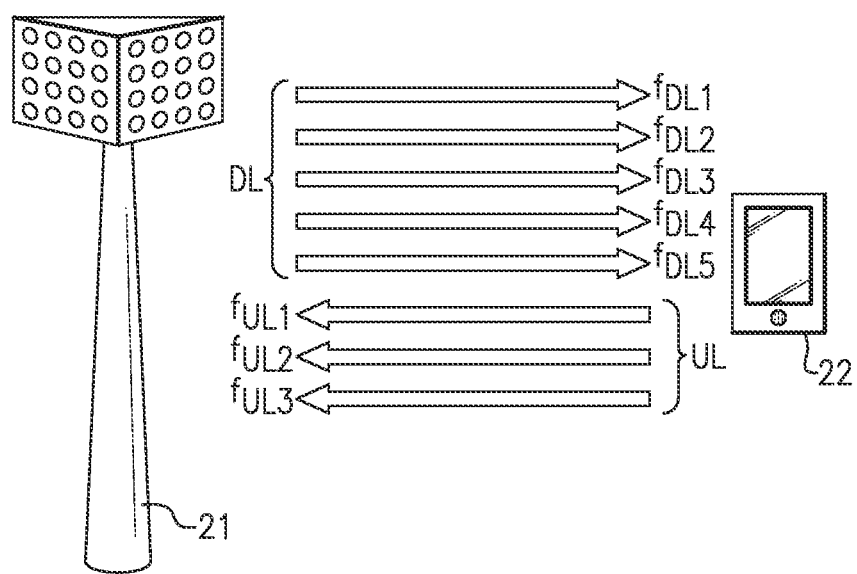
FIG. 10 is a schematic diagram of one example of a communication link using carrier aggregation.

FIG. 10 is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 10 the communications link includes a downlink channel used for RF communications from the base station 21 to the mobile device 22, and an uplink channel used for RF communications from the mobile device 22 to the base station 21.

Although FIG. 10 illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 10, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

With reference to FIG. 10, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Figure 11A:
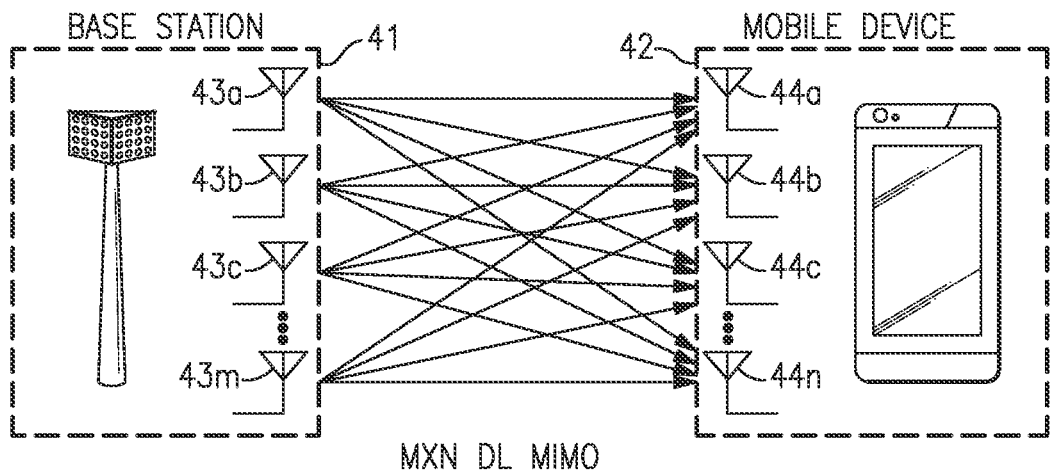
FIG. 11A is a schematic diagram of one example of a downlink channel using multi-input and multi-output (MIMO) communications.
Figure 11B:
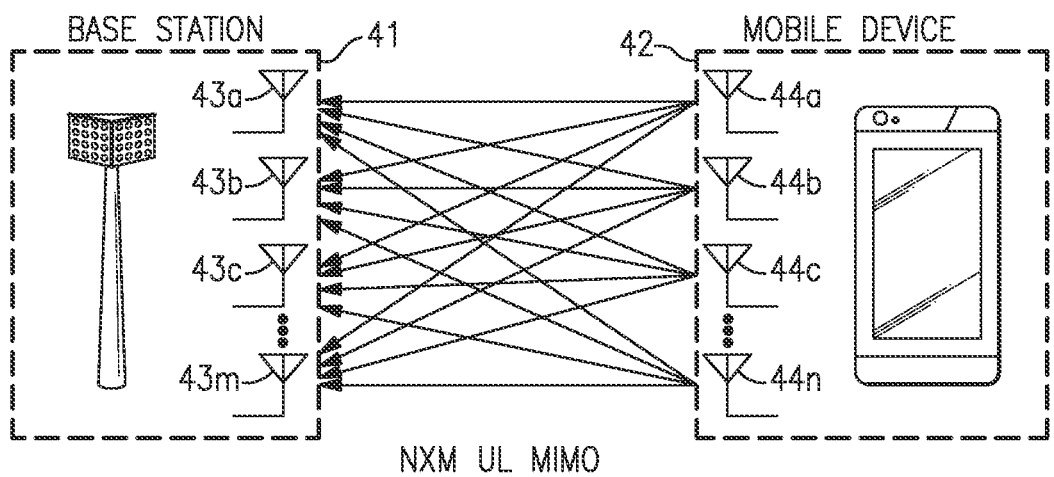
FIG. 11B is schematic diagram of one example of an uplink channel using MIMO communications.

FIG. 11A is a schematic diagram of one example of a downlink channel using multi-input and multi-output (MIMO) communications. FIG. 11B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 11A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 11A illustrates an example of M×N DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 11B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 11B illustrates an example of N×M UL MIMO.

By increasing the level or order of MIMO, bandwidth of an uplink channel and/or a downlink channel can be increased.

Although illustrated in the context of FDD, MIMO communications are also applicable communication links using TDD.

For these 5G networks, one form of base station will be massive multiple input, multiple output (MIMO) based, with an array of perhaps 64-128 antennas capable of multi-beam forming to interact with handheld terminals at very high data rates. Thus, embodiments of the disclosure can be incorporated into the base stations to provide for high capacity applications.

This approach is similar to radar phased array T/R modules, with individual transceivers for each antenna element, although massive MIMO is not a phased array in the radar sense. The objective is optimum coherent signal strength at the terminal(s) rather than direction finding. Further, signal separation will be time division (TD) based, requiring a means of duplexing/switching to separate Tx and Rx signals For discussion, it is assumed that there is one Tx, one Rx module, one duplexing circulator and one antenna filter per antenna. However, other configurations can be used as well.

Figure 12:
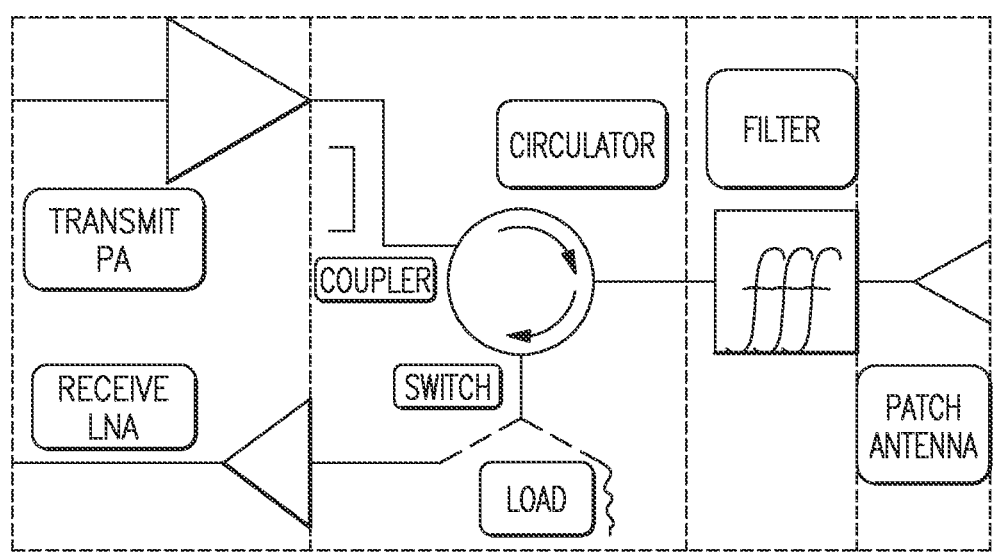
FIG. 12 illustrates a schematic of an antenna system.

FIG. 12 shows a simplified version of an RF transmission system, omitting drivers and switching logic. As shown, the system can include a number of different components, including a circulator. Thus, embodiments of the disclosure can be used as the circulator in the RF system, either for newly created systems or as improved replacements for the previous systems. Specifically, embodiments of the disclosure relate to hybrid solutions using a stripline circulator, and microstrip or stripline topology for the remaining components.

Figure 13:
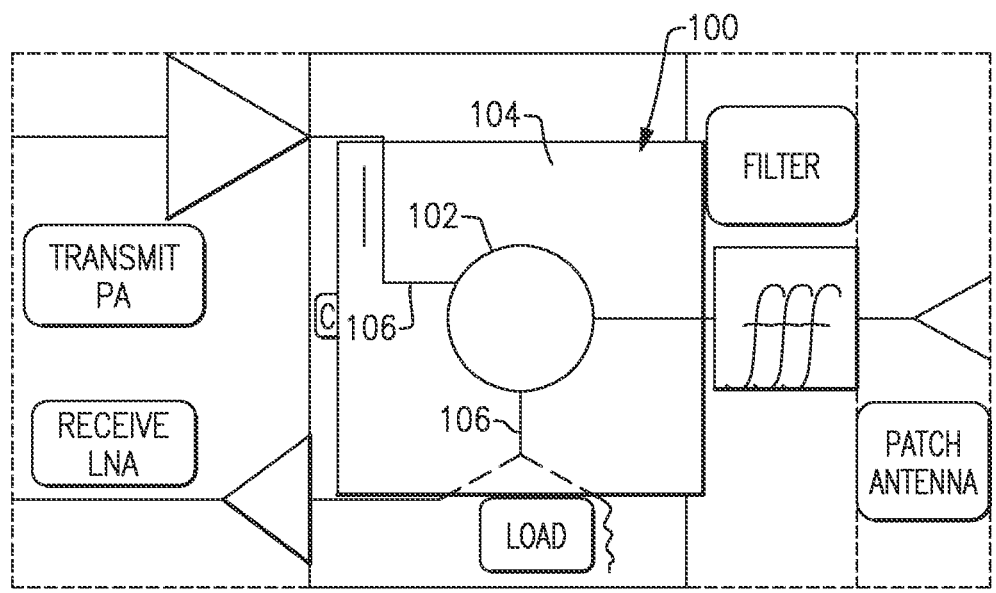
FIG. 13 illustrates a schematic of an antenna system with an embodiment of an integrated microstrip circulator.

FIG. 13 illustrates the integrated component of FIGS. 4A-B discussed above onto the simplified RF antenna structure. As shown, the substrate can include the co-fired ferrite/dielectric tile for the circulator. In addition, a coupler, switch, and load can also be applied to the dielectric tile outside of the ferrite. The conductors and the ground plane could be in a thick film silver. In some embodiments, the circulator subassembly can also be integrated with the power amplifier (PA) and loud noise amplifier (LNA) modules.

Embodiments of the disclosure can have advantages over circulators known in the art. For example,

- Couplers and other transmission lines have much lower insertion loss compared with other couplers, such as semiconductor couplers
- Coupling is more consistent
- Loads can dissipate heat more easily compared with soft substrate
- Circulators have lower loss than all-ferrite substrate based devices
- The dielectric is temperature stable, assisting the coupler and circulator's performance
- The size of the devices can be reduced by using higher dielectric constant ceramic dielectric if required Further, embodiments of the ceramic circulator can have the following advantages:

- Heat/power dissipation/thermal conductivity for PA and load
- Isotropic dielectric (except TTB) for coupler/filter design
- Range of dielectric constant (4-100+) for size reduction
- Low dielectric loss (coupler/filter)
- Tight dielectric constant tolerance (coupler/filter/antenna)
- Stable dielectric constant over temperature (coupler/filter/circulator)
- Modest Cost On the other hand, soft substrate (e.g., softboards) can have the following disadvantages:

- Poor conductivity due to plastic conductivity
- Anisotropic (xy versus z direction)
- Only 3-10 with some, fixed with others
- Higher losses
- Looser tolerances
- Unstable over temperature Accordingly, embodiments of the disclosure can have significant advantages over circulators previously known in the art.

Figure 14:
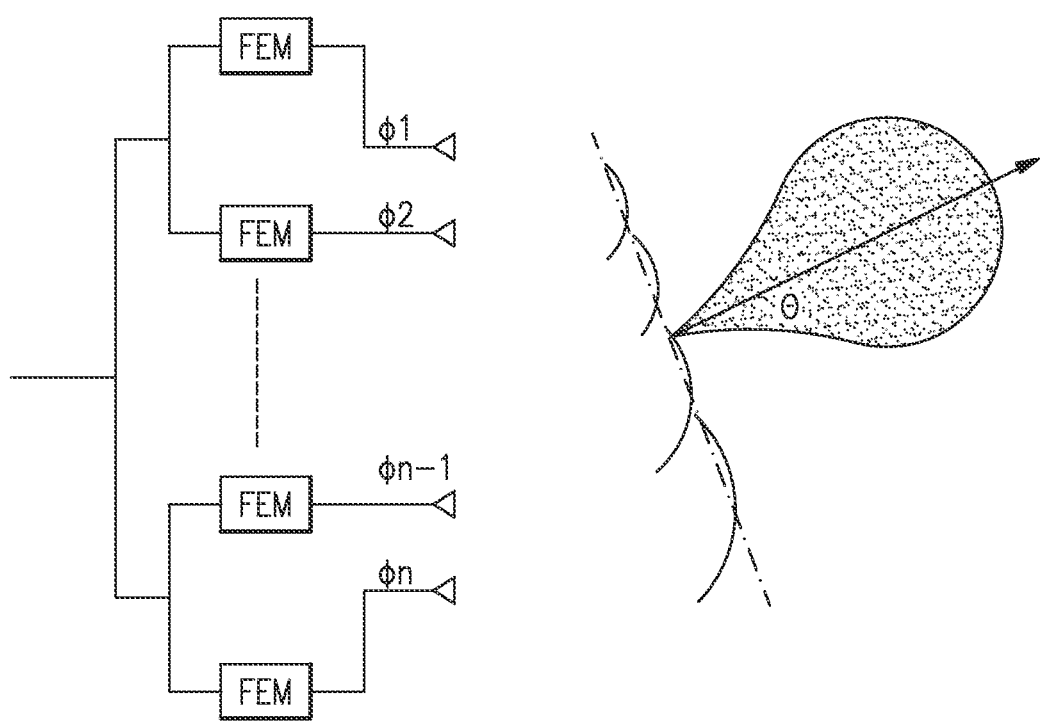
FIG. 14 illustrates a MIMO system incorporating embodiments of the disclosure.

FIG. 14 illustrates another embodiment of a MIMO system that the disclosed microstrip circulators can be incorporated into. With the advent of massive MIMO for 5G system the current antennas will be replaced with antenna arrays with, for example, 64 array elements. Each element can be fed by a separate front end module (FEM).

Figure 15:
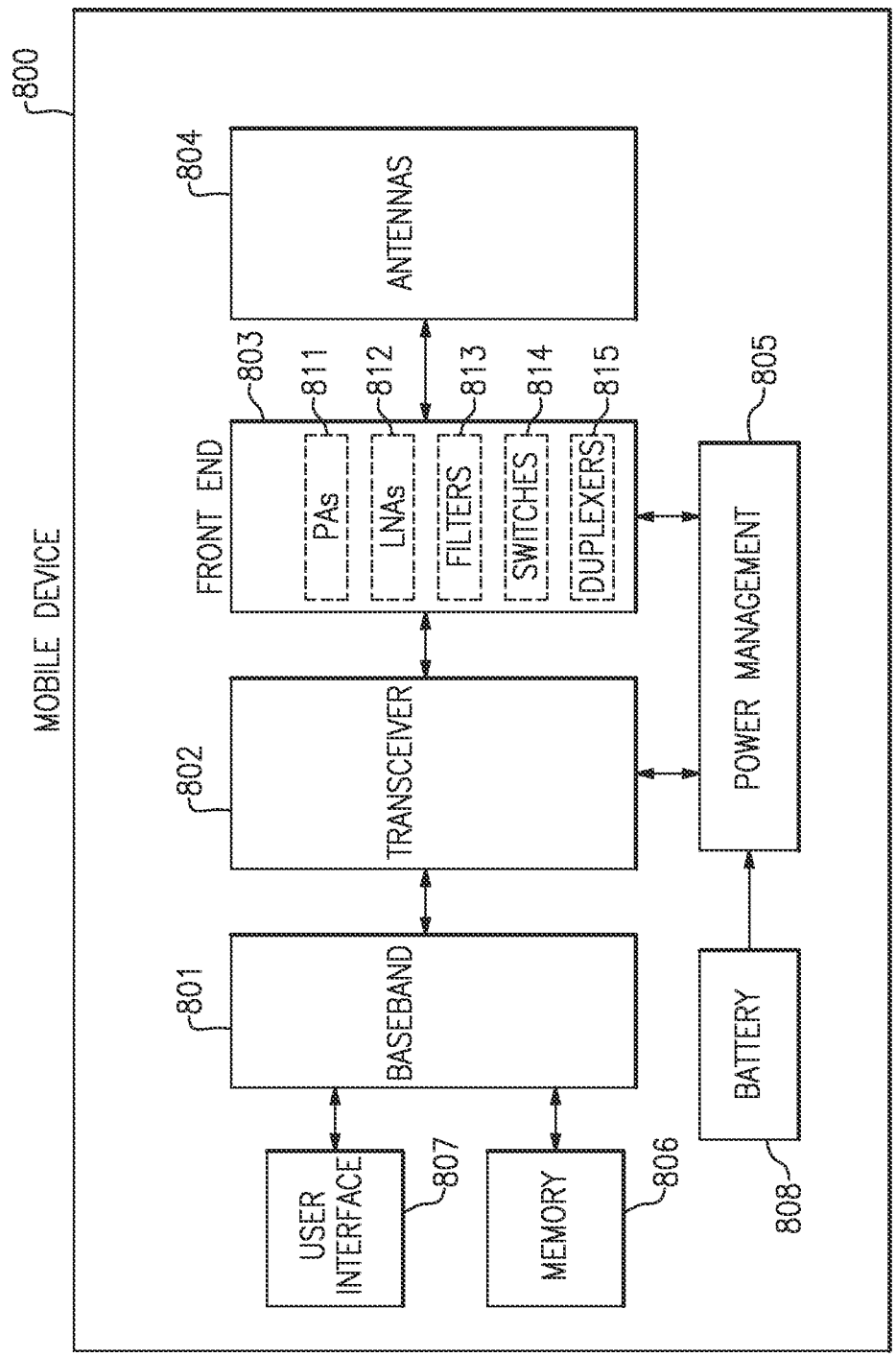
FIG. 15 is a schematic diagram of one example of a mobile device.

FIG. 15 is a schematic diagram of one example of a mobile device 800. The mobile device 800 includes a baseband system 801, a transceiver 802, a front end system 803, antennas 804, a power management system 805, a memory 806, a user interface 807, and a battery 808 and can interact with the base stations including embodiments of the microstrip circulators disclosed herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, Wi-Fi), WPAN (for instance, Bluetooth and ZigBee), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 15 as the transceiver 802. In one example, separate components (for instance, separate circuits or dies) can be provided for handling certain types of RF signals.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas associated transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

Figure 16:
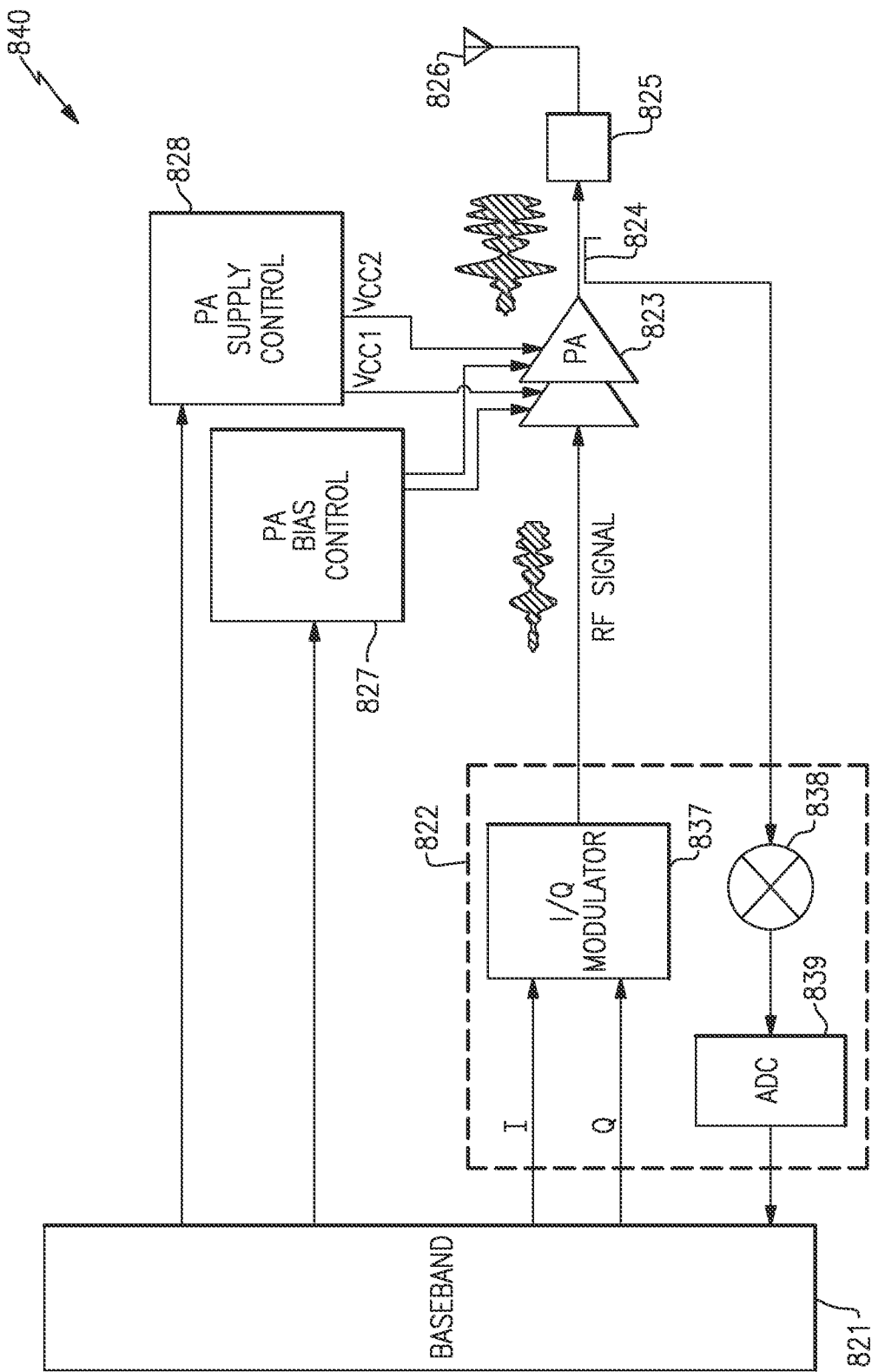
FIG. 16 is a schematic diagram of a power amplifier system according to one embodiment.

FIG. 16 is a schematic diagram of a power amplifier system 840 according to one embodiment. The illustrated power amplifier system 840 includes a baseband processor 821, a transmitter 822, a power amplifier (PA) 823, a directional coupler 824, a bandpass filter 825, an antenna 826, a PA bias control circuit 827, and a PA supply control circuit 828. The illustrated transmitter 822 includes an I/Q modulator 837, a mixer 838, and an analog-to-digital converter (ADC) 839. In certain implementations, the transmitter 822 is included in a transceiver such that both transmit and receive functionality is provided. Embodiments of the disclosed microstrip circulators can be incorporated into the power amplifier system.

Methodology

Figure 17:
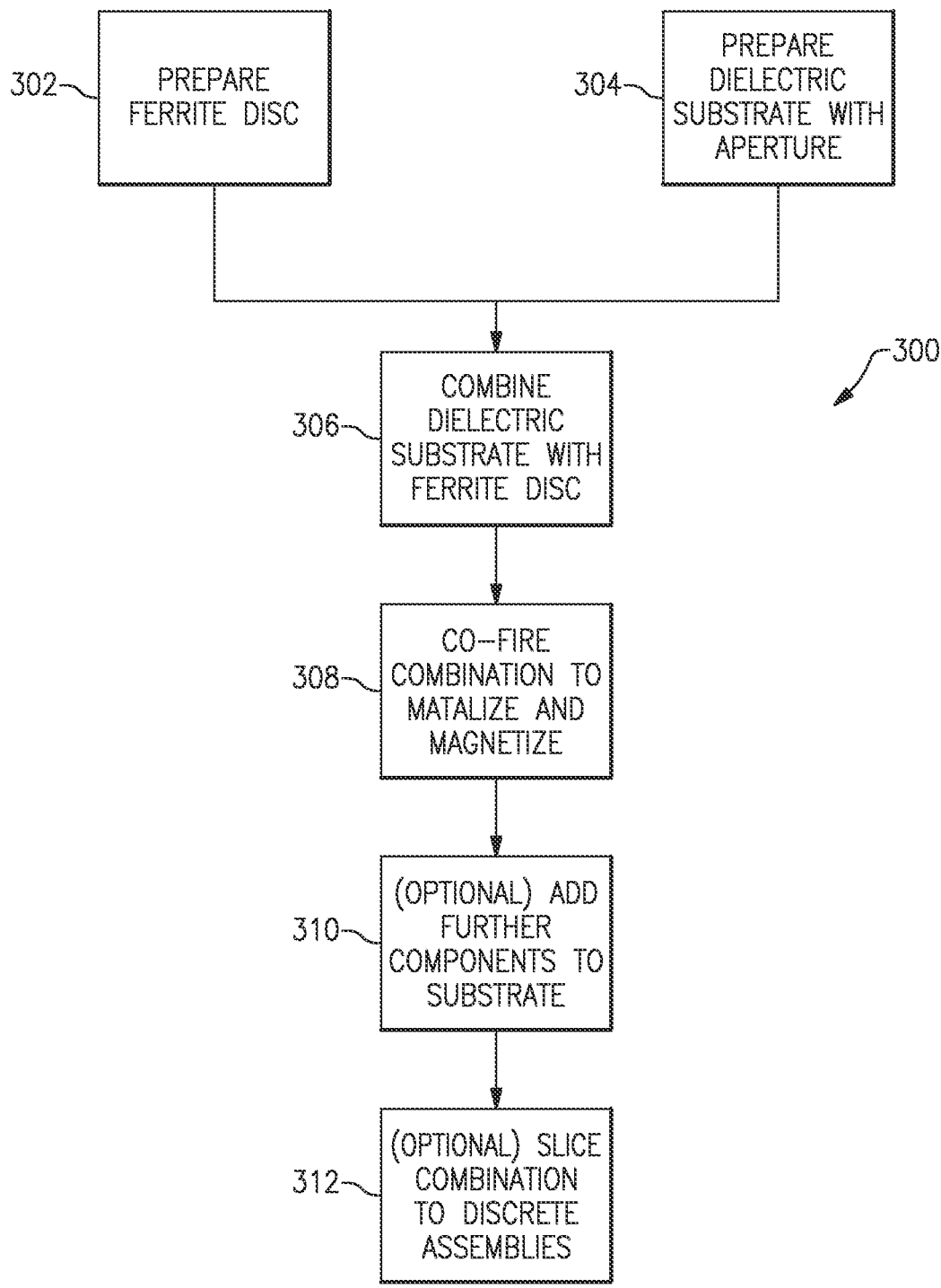
FIG. 17 illustrates a method of forming a composite integrated microstrip circulator.

Disclosed herein are embodiments of a process for making an integrated microstrip component. FIG. 17 discloses an embodiment of a process 300 that can be used.

Returning to FIG. 17, at step 302, a ferrite disc or cylinder can be formed from a magnetic ceramic material by any suitable conventional process known in the art for making such elements, i.e., magnetic oxides of the types used in high frequency electronic components. Similarly, at step 304, a substrate can be formed from a dielectric material by any suitable conventional process. In some embodiments, the ferrite disc can be sintered by firing it in a kiln. Some examples of materials and firing temperatures are set forth below, following this process flow description. However, persons skilled in the art to which the invention relates understand that the materials and processes by which magnetic ceramic and dielectric ceramic elements of this type are made are well known in the art. Therefore, suitable materials and temperatures are not listed exhaustively. All such suitable materials and process for making such rods, cylinders and similar elements of this type are intended to be within the scope of the invention.

At step 306, the disc can be combined into the dielectric substrate with the aperture. For example, the outside surface of the disc can be machined to ensure it is of an outside diameter (OD) that is less than the inside diameter (ID) of the substrate aperture. In some embodiments, the OD is slightly smaller than the ID to enable the disc to be inserted into the substrate.

In some embodiments, the pre-fired disc can be received in an unfired or "green" substrate to form the composite assembly 100 discussed above.

At step 308, the disc and substrate can be co-fired. That is, composite assembly 100 is fired. The co-firing temperature can be lower than the temperature at which disc was fired, to ensure that the physical and electrical properties of the disc remain unchanged. The co-firing temperature can be within the well-known range in which such components are conventionally fired. Importantly, co-firing causes the substrate to shrink around the disc, thereby securing them together. Afterwards, the outside surface of the composite assembly 100 can then be machined to ensure it is of a specified or otherwise predetermined OD. Further, this step can be used to metalize and/or magnetize the composite assembly 100 if the ferrite disc has not previously been magnetized.

Steps 310 and 312 show optional steps that can be taken after the co-firing of the composite assembly 100. For example, additional components can be added 310 onto the substrate, such as circuitry, to form final electronic components. Further, in some embodiments the composite assembly 100 can be sliced 312, or otherwise partitioned, to form a number of discrete assemblies. In some embodiments, both these optional steps can be performed and the particular order is not limiting. In some embodiments, only one of the optional steps can be taken. In some embodiments, neither of the optional steps can be taken.

Accordingly, composite assemblies 100 can be used in manufacturing high frequency electronic components in the same manner as conventionally-produced assemblies of this type. However, the method of the present invention is more economical than conventional methods, as the invention does not involve the use of adhesives.

Figure 18:
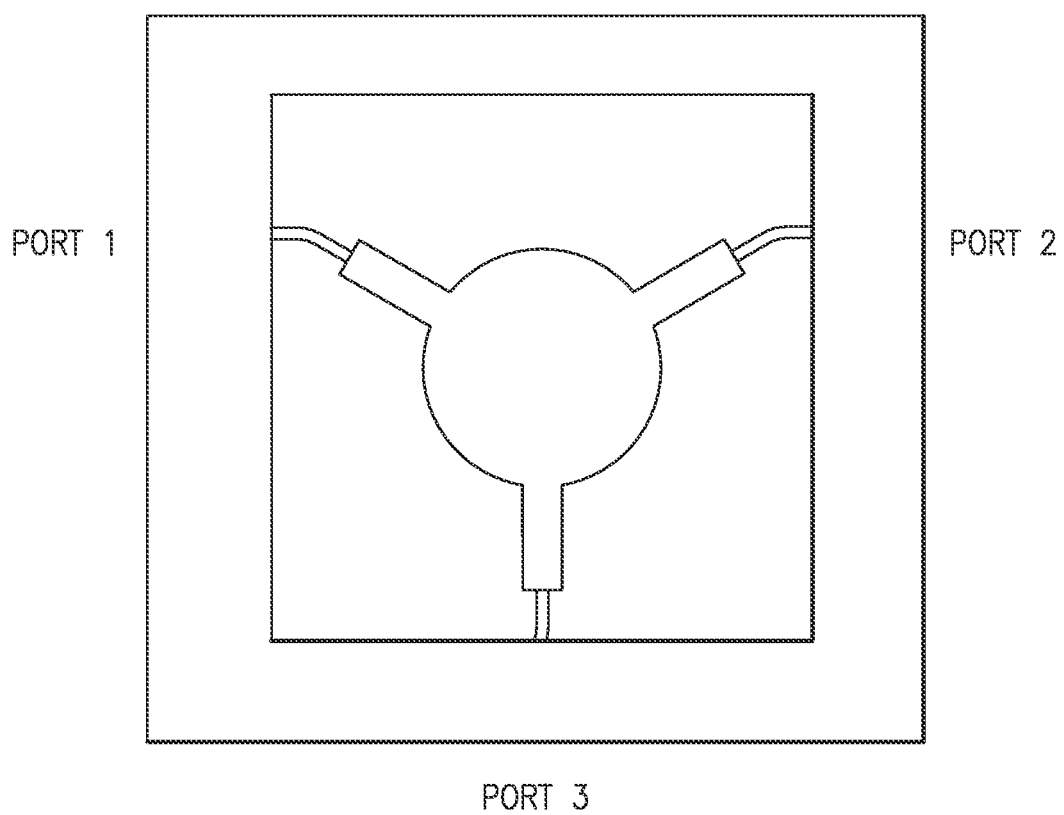
FIG. 18 illustrates an embodiment of an integrated microstrip circulator for testing.

FIG. 18 illustrates an example embodiment of a circulator as discussed herein. Thick film silver can be printed as the circuit. As per standard circulator applications, the circulator includes Port 1, Port 2, and Port 3. One of these ports can be blocked off to form an isolator.

Telecommunication Base Station

Circuits and devices having one or more features as described herein can be implemented in RF applications such as a wireless base-station. Such a wireless base-station can include one or more antennas configured to facilitate transmission and/or reception of RF signals. Such antenna(s) can be coupled to circuits and devices having one or more circulators/isolators as described herein.

Figure 19:
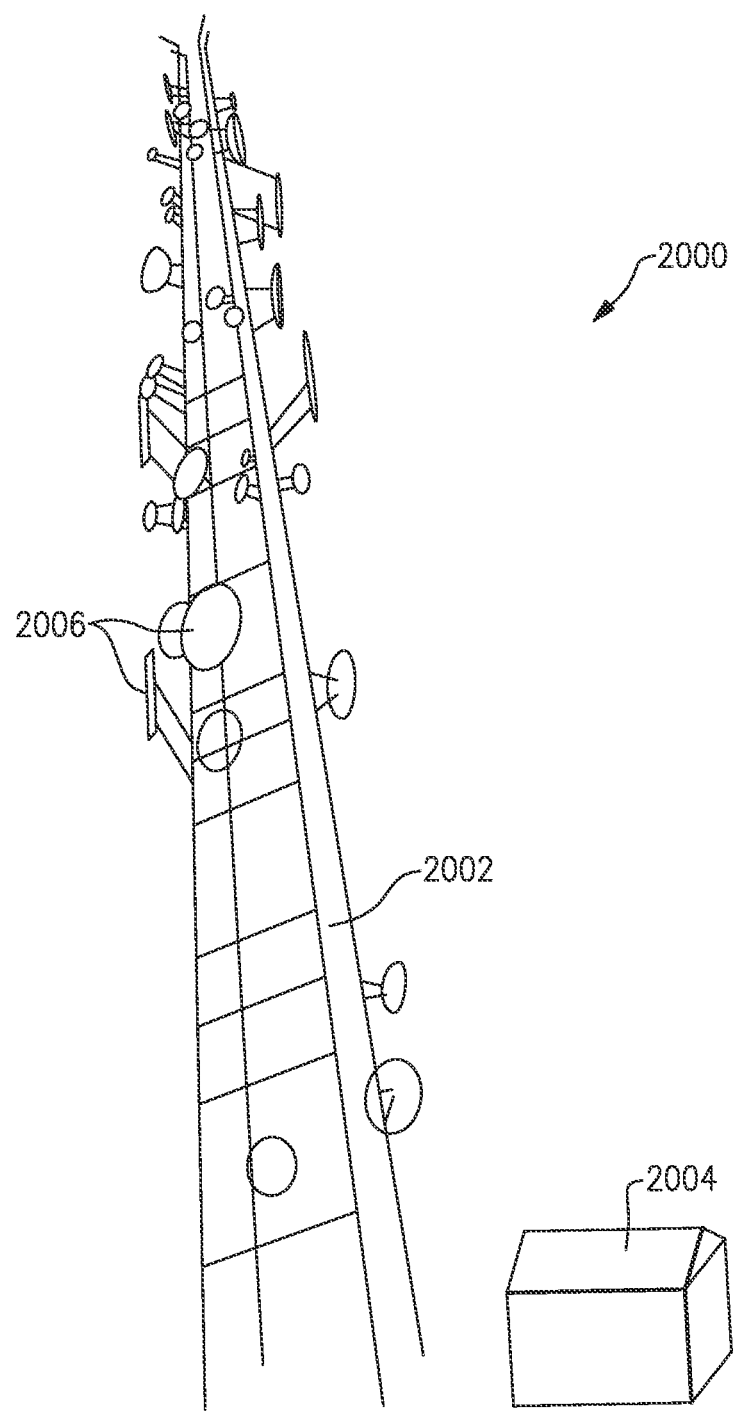
FIG. 19 illustrates a perspective view of a cellular antenna base station incorporating embodiments of the disclosure.

Thus, in some embodiments, the above-disclosed material can be incorporated into different components of a telecommunication base station, such as used for cellular networks and wireless communications. An example perspective view of a base station 2000 is shown in FIG. 19, including both a cell tower 2002 and electronics building 2004. The cell tower 2002 can include a number of antennas 2006, typically facing different directions for optimizing service, which can be used to both receive and transmit cellular signals while the electronics building 2004 can hold electronic components such as filters, amplifiers, etc. discussed below. Both the antennas 2006 and electronic components can incorporate embodiments of the disclosed ceramic materials.

The base station can include an antenna that is configured to facilitate transmission and/or reception of RF signals. Such signals can be generated by and/or processed by a transceiver. For transmission, the transceiver can generate a transmit signal that is amplified by a power amplifier (PA) and filtered (Tx Filter) for transmission by the antenna. For reception, a signal received from the antenna can be filtered (Rx Filter) and amplified by a low-noise amplifier (LNA) before being passed on to the transceiver. In the example context of such Tx and Rx paths, circulators and/or isolators having one or more features as described herein can be implemented at or in connection with, for example, the PA circuit and the LNA circuit. The circulators and isolators can include embodiments of the material disclosed herein. Further, the antennas can include the materials disclosed herein, allowing them to work on higher frequency ranges.

Figure 20:
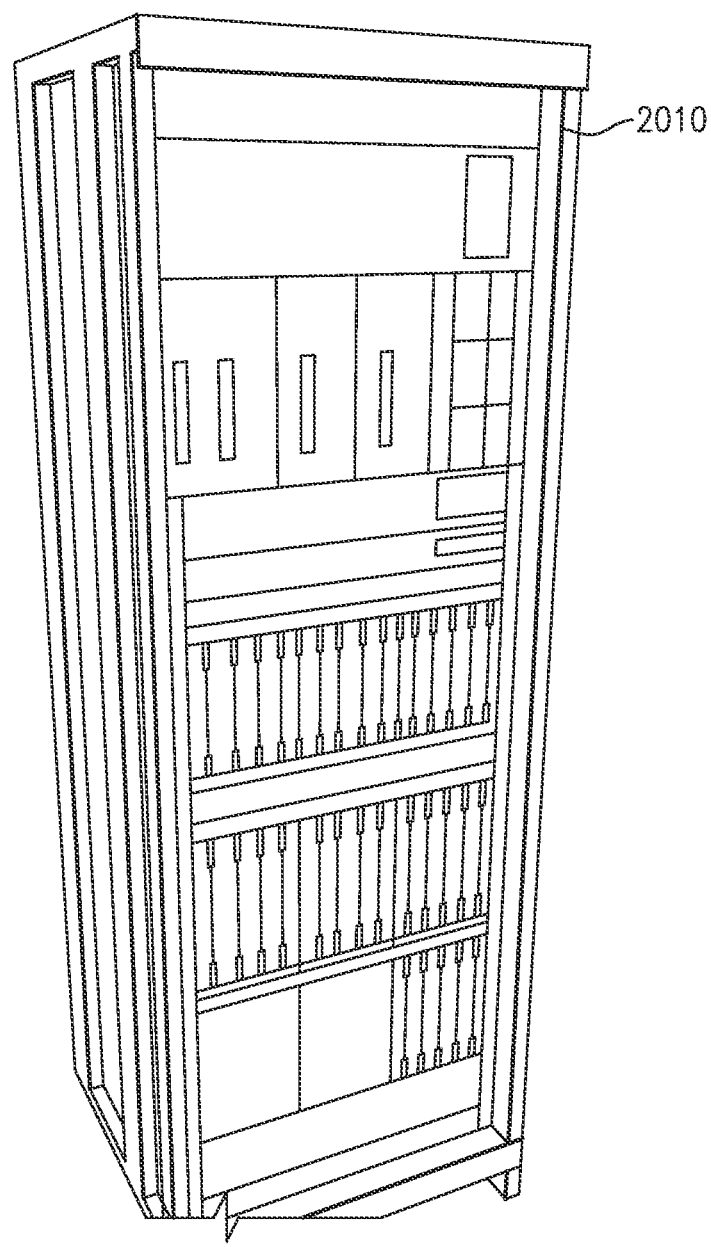
FIG. 20 illustrates housing components of a base station incorporating embodiments of the disclosed material.

FIG. 20 illustrates hardware 2010 that can be used in the electronics building 2004, and can include the components discussed above with respect to FIG. 19. For example, the hardware 2010 can be a base station subsystem (BSS), which can handle traffic and signaling for the mobile systems.

Figure 21:
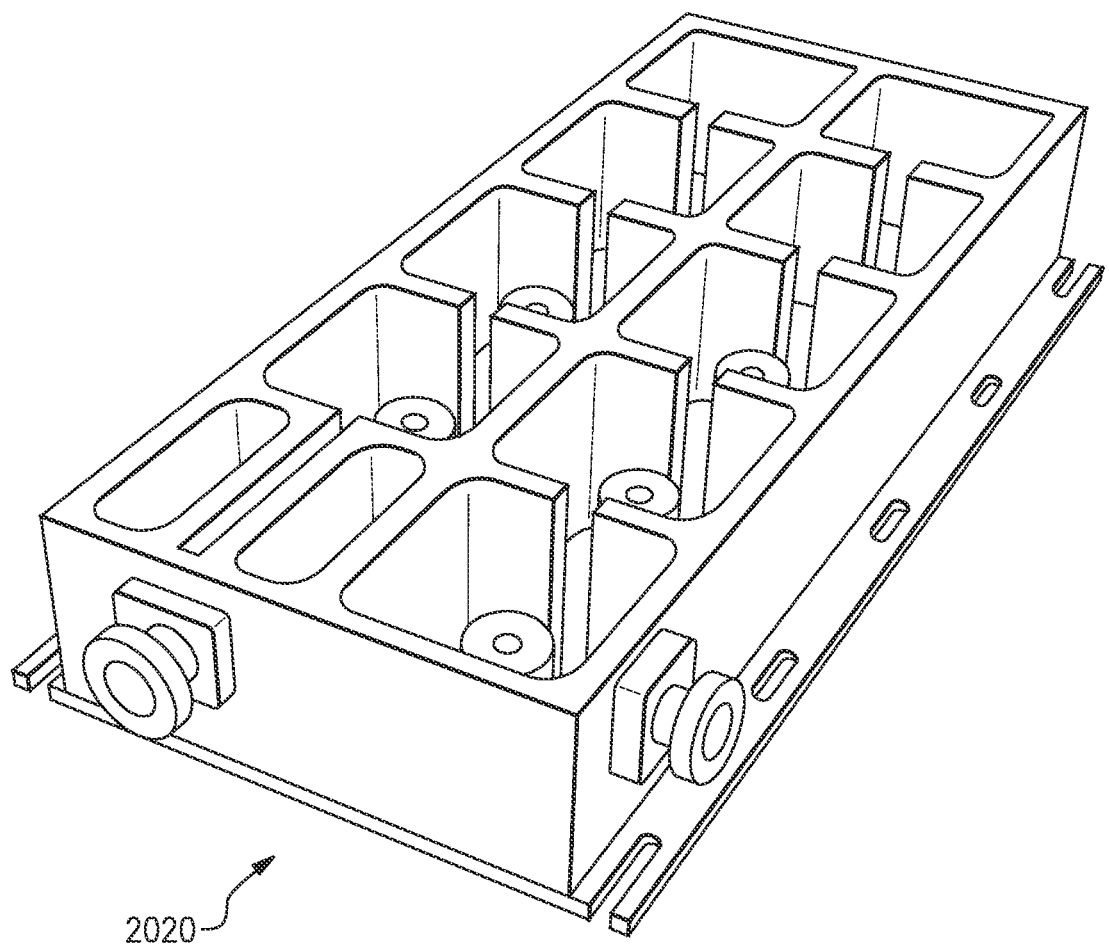
FIG. 21 illustrates a cavity filter used in a base station incorporating embodiments of the material disclosed herein.

FIG. 21 illustrates a further detailing of the hardware 2010 discussed above. Specifically, FIG. 21 depicts a cavity filter/combiner 2020 which can be incorporated into the base station. The cavity filter 2020 can include, for example, bandpass filters such as those incorporating embodiments of the disclosed material, and can allow the output of two or more transmitters on different frequencies to be combined.

Figure 22:
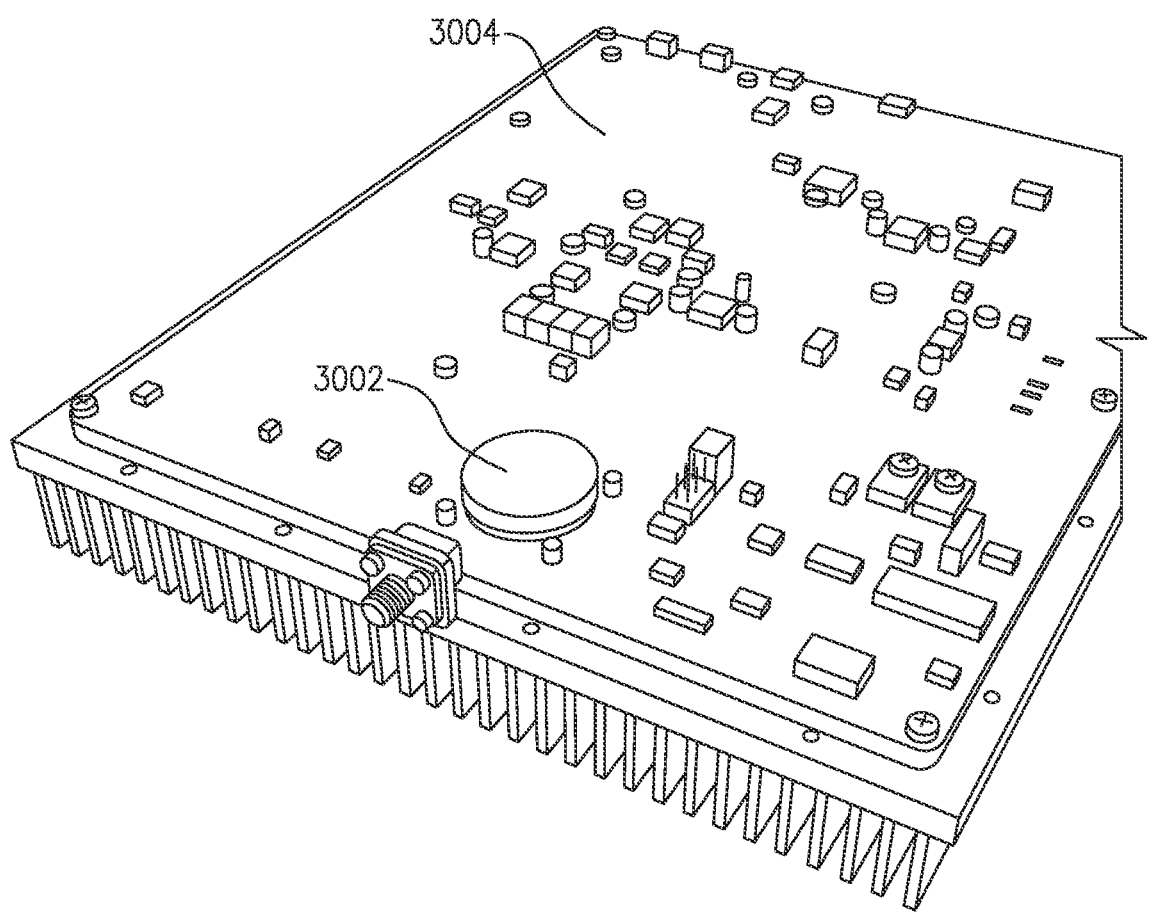
FIG. 22 illustrates an embodiment of a circuit board including embodiments of the material disclosed herein.

FIG. 22 illustrates a circuit board 30004 which can include an isolator/circulator/filter 3002 and can be incorporated into the base station discussed above.

From the foregoing description, it will be appreciated that inventive products and approaches for high Q, temperature stable materials with low dielectric constants are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A low loss dielectric material for radio frequency applications, comprising:
   an aluminate including one of cobalt (Co) or nickel (Ni) crystallized in a spinel structure; and
   a titanate including one of Co or Ni crystallized in a spinel structure,
   wherein the low loss dielectric material has a loss tangent less than 0.0001, a dielectric constant of 8-15 and a temperature coefficient of resonant frequency having a magnitude less than 20 ppm/° C.

2. The low loss dielectric material of claim 1, wherein the aluminate comprises $NiAl_2O_4$ and the titanate comprises $Ni_2TiO_4$.

3. The low loss dielectric material of claim 2, wherein the $NiAl_2O_4$ and the $Ni_2TiO_4$ form a solid solution including $Ni_{1+x}Al_{2-2x}Ti_xO_4$, wherein x is greater than 0 and less than or equal to 0.5.

4. The low loss dielectric material of claim 1, further comprising one or both of $NiTiO_3$ and $Ni_5TiO_7$.

5. The low loss dielectric material of claim 1, wherein the aluminate comprises $CoAl_2O_4$ and the titanate comprises includes $Co_2TiO_4$.

6. The low loss dielectric material of claim 5, wherein the $CoAl_2O_4$ and the $Co_2TiO_4$ form a solid solution including $Co_{1+x}Al_{2-2x}Ti_xO_4$, where x is greater than 0 and less than or equal to 0.5.

7. The low loss dielectric material of claim 5, further comprising $CoTi_2O_5$.

8. The low loss dielectric material of claim 1, wherein one or both of the aluminate and the titanate further comprise zinc.

9. The low loss dielectric material of claim 8, wherein the aluminate comprises $(Zn_{1-y}Co_y)Al_2O_4$ and the titanate comprises $(Zn_{1-z}Co_z)_2TiO_4$, and each of y and z is greater than zero and less than 1.

10. The low loss dielectric material of claim 9, wherein the $(Zn_{1-y}Co_y)Al_2O_4$ and the $(Zn_{1-z}Co_z)_2TiO_4$ form a solid solution including $(Zn_{1-y}Co_y)_{1+x}Al_{2-2x}Ti_xO_4$, and x is greater than 0 and less than 0.5.

11. The low loss dielectric material of claim 8, wherein the aluminate comprises $(Zn_{1-y}Ni_y)Al_2O_4$ and the titanate comprises $(Zn_{1-z}Ni_z)_2TiO_4$, and each of y and z is greater than zero and less than 1.

12. The low loss dielectric material of claim 11, wherein the $(Zn_{1-y}Ni_y)Al_2O_4$ and the $(Zn_{1-z}Ni_z)_2TiO_4$, form a solid solution including $(Zn_{1-y}Ni_y)_{1+x}Al_{2-2x}Ti_xO_4$, and x is greater than 0 and less than 0.5.

13. A radiofrequency component comprising:
    a ceramic disk formed of a low loss dielectric material, the low loss dielectric material including an aluminate including one of cobalt (Co) or nickel (Ni) crystallized in a spinel structure, and a titanate including one of Co or Ni crystallized in a spinel structure.

14. The radiofrequency component of claim 13, wherein the radiofrequency component comprises one or more of a co-axial resonator, a dielectric filter, an isolator and a circulator.

15. The radiofrequency component of claim 14, wherein the low loss dielectric material has a loss tangent less than 0.0001, a dielectric constant of 8-15 and a temperature coefficient of resonant frequency having a magnitude less than 20 ppm/° C.

16. The radiofrequency component of claim 15, wherein the aluminate includes one of $NiAl_2O_4$ and $CoAl_2O_4$, and the titanate includes one of $Ni_2TiO_4$ and $Co_2TiO_4$.

17. The radiofrequency component of claim 15, wherein the aluminate and the titanate form a solid solution.

18. A method of manufacturing a component for a radio frequency device, the method comprising:

mixing component oxide powders to form a mixed powder;

calcining the mixed powder;

forming the calcined mixed powder into a ceramic disk; and sintering the ceramic disk, thereby forming the component formed of a low loss dielectric material, the low loss dielectric material including an aluminate including one of cobalt (Co) or nickel (Ni) crystallized in a spinel structure, and a titanate including one of Co or Ni crystallized in a spinel structure.

19. The method of claim 18, wherein the component is selected from the group consisting of a filter, an isolator, a circulator and a resonator.

20. The method of claim 19, wherein the low loss dielectric material has a loss tangent less than 0.0001, a dielectric constant of 8-15 and a temperature coefficient of resonant frequency having a magnitude less than 20 ppm/° C.

* * * * *